(12) United States Patent
LaChapelle et al.

(10) Patent No.: US 11,442,150 B2
(45) Date of Patent: Sep. 13, 2022

(54) LIDAR SYSTEM WITH SPATIAL LIGHT MODULATOR

(71) Applicant: Luminar, LLC, Orlando, FL (US)

(72) Inventors: Joseph G. LaChapelle, Philomath, OR (US); Philip W. Smith, Melbourne, FL (US); Matthew D. Weed, Orlando, FL (US); Jason M. Eichenholz, Orlando, FL (US)

(73) Assignee: Luminar, LLC, Orlando, FL (US)

( * ) Notice: Subject to any disclaimer, the term of this patent is extended or adjusted under 35 U.S.C. 154(b) by 401 days.

(21) Appl. No.: 16/788,762

(22) Filed: Feb. 12, 2020

(65) Prior Publication Data

US 2020/0256960 A1 Aug. 13, 2020

Related U.S. Application Data

(60) Provisional application No. 62/805,061, filed on Feb. 13, 2019.

(51) Int. Cl.
*G01S 7/48* (2006.01)
*G01S 7/481* (2006.01)
*G01S 7/4863* (2020.01)

(52) U.S. Cl.
CPC .......... *G01S 7/4817* (2013.01); *G01S 7/4863* (2013.01)

(58) Field of Classification Search
CPC ....... G01S 7/4817; G01S 7/4863; G01S 17/89
See application file for complete search history.

(56) References Cited

U.S. PATENT DOCUMENTS

2015/0378023 A1* 12/2015 Royo Royo ............ G01S 17/89
356/5.01

OTHER PUBLICATIONS

Fenske et al., "DLP DMD Technology: LIDAR Ambient Light Reduction," Texas Instruments Literature No. DLPA093, Sep. 2018.
Marraccini et al., "Digital Micromirror Device-Based Robust Object Boundary Mapping Sensor," Proc. SPIE 8026, SPIE Defense, Security, and Sensing, May 26, 2011.
Riza et al., "Digital Micro-Mirror Device-Based Broadband Optical Image Sensor for Robust Imaging Applications," Optics Communications 284 (2011) 103-111.
Riza et al., "Programmable Optic-Based Robust Underwater Free-Space Optical Data Transfer Link Designs for Applications Using High Power Lasers," Photonics Ireland, Sep. 2-4, 2015.

(Continued)

*Primary Examiner* — Tony Ko

(57) ABSTRACT

In one embodiment, a lidar system includes a light source configured to emit a pulse of light and a scanner configured to direct the emitted pulse of light into a field of regard of the lidar system. The lidar system also includes a receiver configured to receive a portion of the emitted pulse of light scattered by a target located a distance from the lidar system. The receiver includes a digital micromirror device (DMD) that includes a two-dimensional array of electrically addressable micromirrors, where a portion of the micromirrors are configured to be set to an active-on state to direct the received pulse of light to a detector array. The detector array includes a two-dimensional array of detector elements, where the detector array is configured to detect the received pulse of light and produce an electrical signal corresponding to the received pulse of light.

29 Claims, 16 Drawing Sheets

(56) References Cited

OTHER PUBLICATIONS

Smith et al., "Single Chip Lidar with Discrete Beam Steering by Digital Micromirror Device," Optics Express, vol. 25, No. 13, Jun. 26, 2017.

Sumriddetchkajom et al., "Micro-Electro-Mechanical System-Based Digitally Controlled Optical Beam Profiler," Applied Optics, vol. 41, No. 18, Jun. 20, 2002.

\* cited by examiner

LIDAR SYSTEM WITH SPATIAL LIGHT MODULATOR

PRIORITY

This application claims the benefit, under 35 U.S.C. § 119(e), of U.S. Provisional Patent Application No. 62/805,061, filed 13 Feb. 2019, which is incorporated herein by reference.

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

DESCRIPTION OF EXAMPLE EMBODIMENTS

Figure 1:
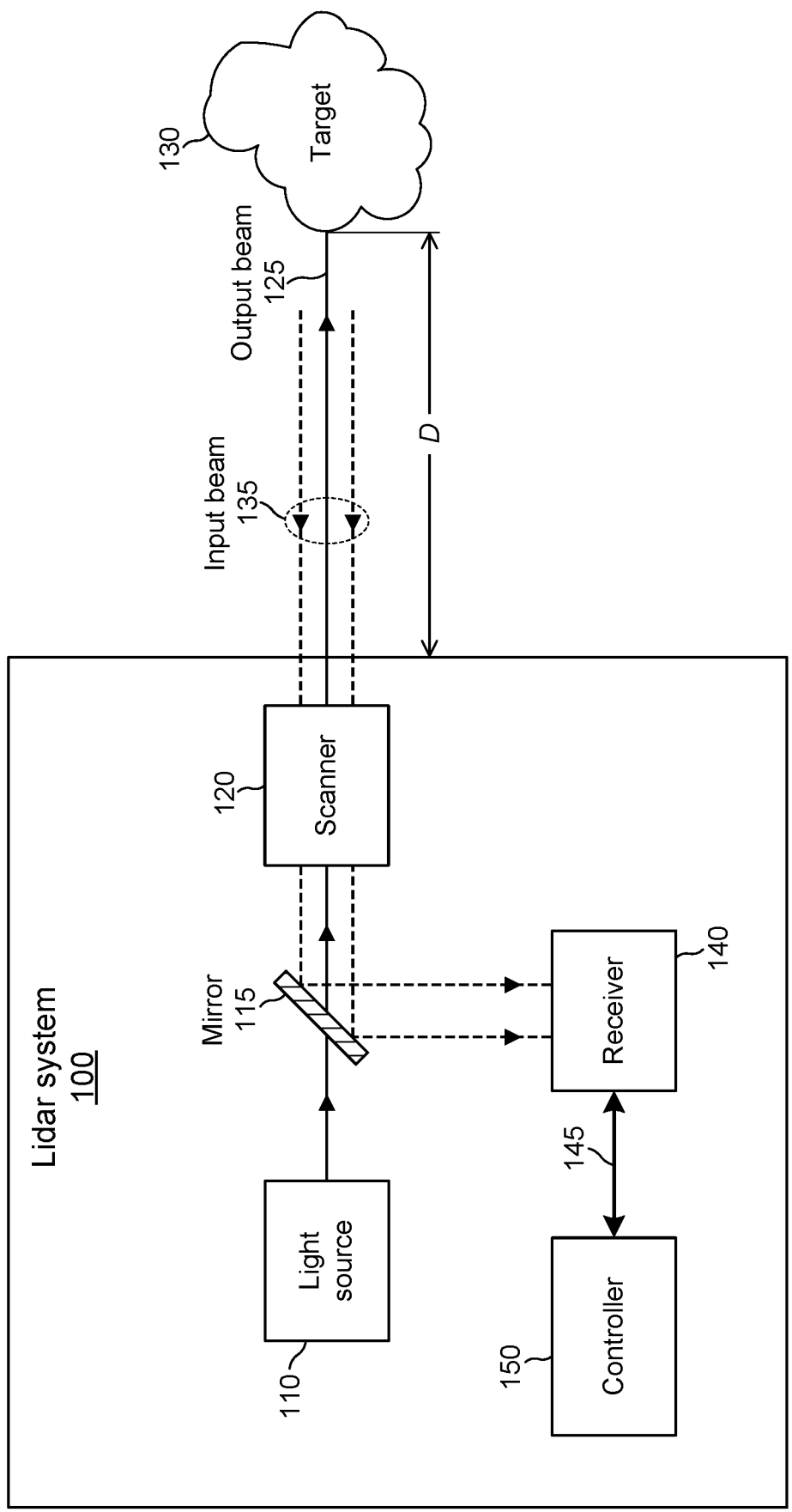
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (µJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may be referred to as an optical signal, output optical signal, emitted optical signal, laser beam, light beam, optical beam, emitted beam, emitted light, or beam. In particular embodiments, input beam 135 may be referred to as a received optical signal, input optical signal, return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as D=c·T/2, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 μs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses of light with a pulse duration of approximately 1-5 ns. As another example, light source 110 may be a pulsed laser that produces pulses of light at a pulse repetition frequency of approximately 100 kHz to 10 MHz or a pulse period (e.g., a time between consecutive pulses) of approximately 100 ns to 10 μs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 μs. As another example, light source 110 may have a pulse repetition frequency (which may be referred to as a repetition rate) that can be varied from approximately 200 kHz to 3 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 μJ, 0.1 μJ, 0.5 μJ, 1 μJ, 2 μJ, 10 μJ, 100 μJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E=P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 μJ has a peak power of approximately 1 kW. The average power ($P_{av}$) of an output beam 125 can be related to the pulse repetition frequency (PRF) and pulse energy by the expression $P_{av}=PRF \cdot E$. For example, if the pulse repetition frequency is 500 kHz, then the average power of an output beam 125 with 1-0 pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm. As another example, light source 110 may include an InGaAsP laser diode that produces optical pulses at a wavelength between approximately 1500 nm and approximately 1510 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-power optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a SOA. The SOA may include an active optical waveguide configured to receive light from the seed laser diode and amplify the light as it propagates through the waveguide. The optical gain of the SOA may be provided by pulsed or direct-current (DC) electrical current supplied to the SOA. The SOA may be integrated on the same chip as the seed laser diode, or the SOA may be a separate device with an anti-reflection coating on its input face or output face. As another example, light source 110 may include a seed laser diode followed by a SOA, which in turn is followed by a fiber-optic amplifier. For example, the seed laser diode may produce relatively low-power seed pulses which are amplified by the SOA, and the fiber-optic amplifier may further amplify the optical pulses.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a Θ-degree rotation by a scanning mirror results in a 2Θ-degree angular scan of output beam 125).

In particular embodiments, scanner 120 may include one or more mirrors, where each mirror is mechanically driven by a galvanometer scanner, a resonant scanner, a microelectromechanical systems (MEMS) device, a voice coil motor, an electric motor, or any suitable combination thereof. A galvanometer scanner (which may be referred to as a galvanometer actuator) may include a galvanometer-based scanning motor with a magnet and coil. When an electrical current is supplied to the coil, force is applied to the magnet, which causes a mirror attached to the galvanometer scanner to pivot. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter, length, or width between approximately 0.1 mm and 10 mm, and the mirror may be pivoted back and forth using electromagnetic or electrostatic actuation. A voice coil motor (which may be referred to as a voice coil actuator) may include a magnet and coil. When an electrical current is supplied to the coil, a translational force is applied to the magnet, which causes a mirror attached to the magnet to move or rotate. An electric motor, such as for example, a brushless DC motor or a synchronous electric motor, may be used to continuously rotate a mirror at a substantially fixed frequency (e.g., a rotational frequency of approximately 1 Hz, 10 Hz, 50 Hz, 100 Hz, 500 Hz, or 1,000 Hz). For example, the mirror may be a polygon mirror that is continuously rotated by the synchronous electric motor in one rotation direction (e.g., clockwise or counter-clockwise relative to a particular rotation axis).

In particular embodiments, a scanning mirror (which may be referred to as a scan mirror) may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a MEMS device, or any other suitable actuator or mechanism. As an example, a scanner 120 may include a scanning mirror attached to a galvanometer scanner configured to pivot back and forth over a 1° to 45° angular range. As another example, a scanner 120 may include a scanning mirror that is attached to or is part of a MEMS device configured to scan over a 1° to 45° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is substantially orthogonal to the first direction. As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners or may each be MEMS-based scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, InGaAs, or AlInAsSb (aluminum indium arsenide antimonide). The active region may refer to an area over which a detector may receive or detect input light. An active region may have any suitable size or diameter, such as for example, a diameter of approximately 10 µm, 25 µm, 50 µm, 80 µm, 100 µm, 200 µm, 500 µm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100 or outside the lidar system 100. In particular embodiments, a controller 150 may include any suitable arrangement or combination of logic circuitry, analog circuitry, or digital circuitry.

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and the controller 150 may determine a time-of-flight value for an optical pulse based on timing information associated with (i) a time when the pulse was emitted by light source 110 and (ii) a time when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to a distance over which the lidar system 100 is configured to sense or identify targets 130 located within a field of regard of the lidar system 100. The operating range of lidar system 100 may be any suitable distance, such as for example, 25 m, 50 m, 100 m, 200 m, 250 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time T between the emission of successive optical signals by the expression $R_{OP}=c\cdot\tau/2$. For a lidar system 100 with a 200-m operating range ($R_{OP}=200$ m), the time $\tau$ between successive pulses (which may be referred to as a pulse period, a pulse repetition interval (PRI), or a time period between pulses) is approximately $2\cdot R_{OP}/c \approx 1.33$ μs. The pulse period $\tau$ may also correspond to the time of flight for a pulse to travel to and from a target 130 located a distance $R_{OP}$ from the lidar system 100. Additionally, the pulse period $\tau$ may be related to the pulse repetition frequency (PRF) by the expression $\tau=1/PRF$. For example, a pulse period of 1.33 μs corresponds to a PRF of approximately 752 kHz.

In particular embodiments, a lidar system 100 may be used to determine the distance to one or more downrange targets 130. By scanning an output beam 125 of the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5\times10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1:2014 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm. As another example, lidar system 100 may have an operating wavelength between approximately 1500 nm and approximately 1510 nm.

In particular embodiments, one or more lidar systems 100 may be integrated into a vehicle. As an example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) configured to assist a driver of the vehicle in operating the vehicle. A lidar system 100 may provide information to an ADAS about the environment around the vehicle. For example, a lidar system 100 may be part of an ADAS that provides information (e.g., about the surrounding environment) or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, or emitted light) may include pulses of light, CW light, amplitude-modulated light, frequency-modulated light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may be a pulsed lidar system and may include a light source 110 configured to produce pulses of light. Alternatively, a lidar system 100 may be configured to operate as a frequency-modulated continuous-wave (FMCW) lidar system and may include a light source 110 configured to produce CW light or a frequency-modulated optical signal.

In particular embodiments, a lidar system 100 may be a FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined from the time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered by the remote target) relative to the modulation frequency of the emitted light. A round-trip time for the emitted light to travel to a target 130 and back to the lidar system may correspond to a frequency difference between the received scattered light and a portion of the emitted light.

For example, for a linearly chirped light source (e.g., a frequency modulation that produces a linear change in frequency with time), the larger the frequency difference between the emitted light and the received light, the farther away the target 130 is located. The frequency difference may be determined by mixing the received light with a portion of the emitted light (e.g., by coupling the two beams onto a detector, or by mixing analog electric signals corresponding to the received light and the emitted light) and determining the resulting beat frequency. For example, an electrical signal from an APD may be analyzed using a fast Fourier transform (FFT) technique to determine the frequency difference between the emitted light and the received light. If a linear frequency modulation m (e.g., in units of Hz/s) is applied to a CW laser, then the round-trip time T may be related to the frequency difference between the received scattered light and the emitted light $\Delta f$ by the expression $T = \Delta f/m$. Additionally, the distance D from the target 130 to the lidar system 100 may be expressed as $D = c \cdot \Delta f/(2m)$, where c is the speed of light. For example, for a light source 110 with a linear frequency modulation of $10^{12}$ Hz/s (or, 1 MHz/μs), if a frequency difference (between the received scattered light and the emitted light) of 330 kHz is measured, then the distance to the target is approximately 50 meters (which corresponds to a round-trip time of approximately 330 ns). As another example, a frequency difference of 1.33 MHz corresponds to a target located approximately 200 meters away.

The light source 110 for a FMCW lidar system may include a direct-emitter laser diode or a seed laser diode followed by a SOA. The seed laser diode or the direct-emitter laser diode may be operated in a CW manner (e.g., by driving the laser diode with a substantially constant DC current), and the frequency modulation may be provided by an external modulator (e.g., an electro-optic phase modulator). Alternatively, the frequency modulation may be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) may have any suitable frequency or shape (e.g., piecewise linear, sinusoidal, triangle-wave, or sawtooth).

Figure 2:
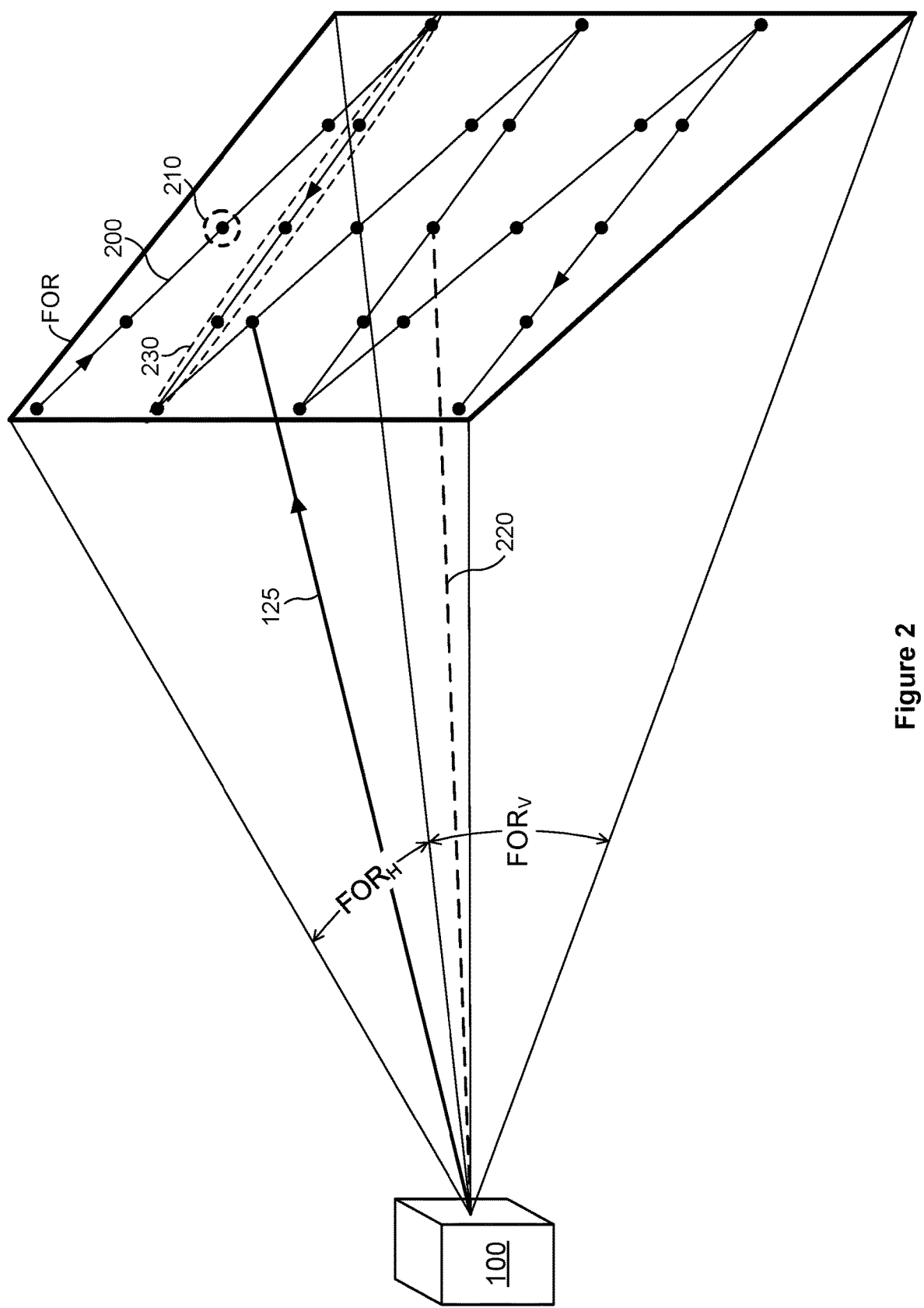
FIG. 2 illustrates an example scan pattern produced by a lidar system.

FIG. 2 illustrates an example scan pattern 200 produced by a lidar system 100. A scanner 120 of the lidar system 100 may scan the output beam 125 (which may include multiple emitted optical signals) along a scan pattern 200 that is contained within a FOR of the lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
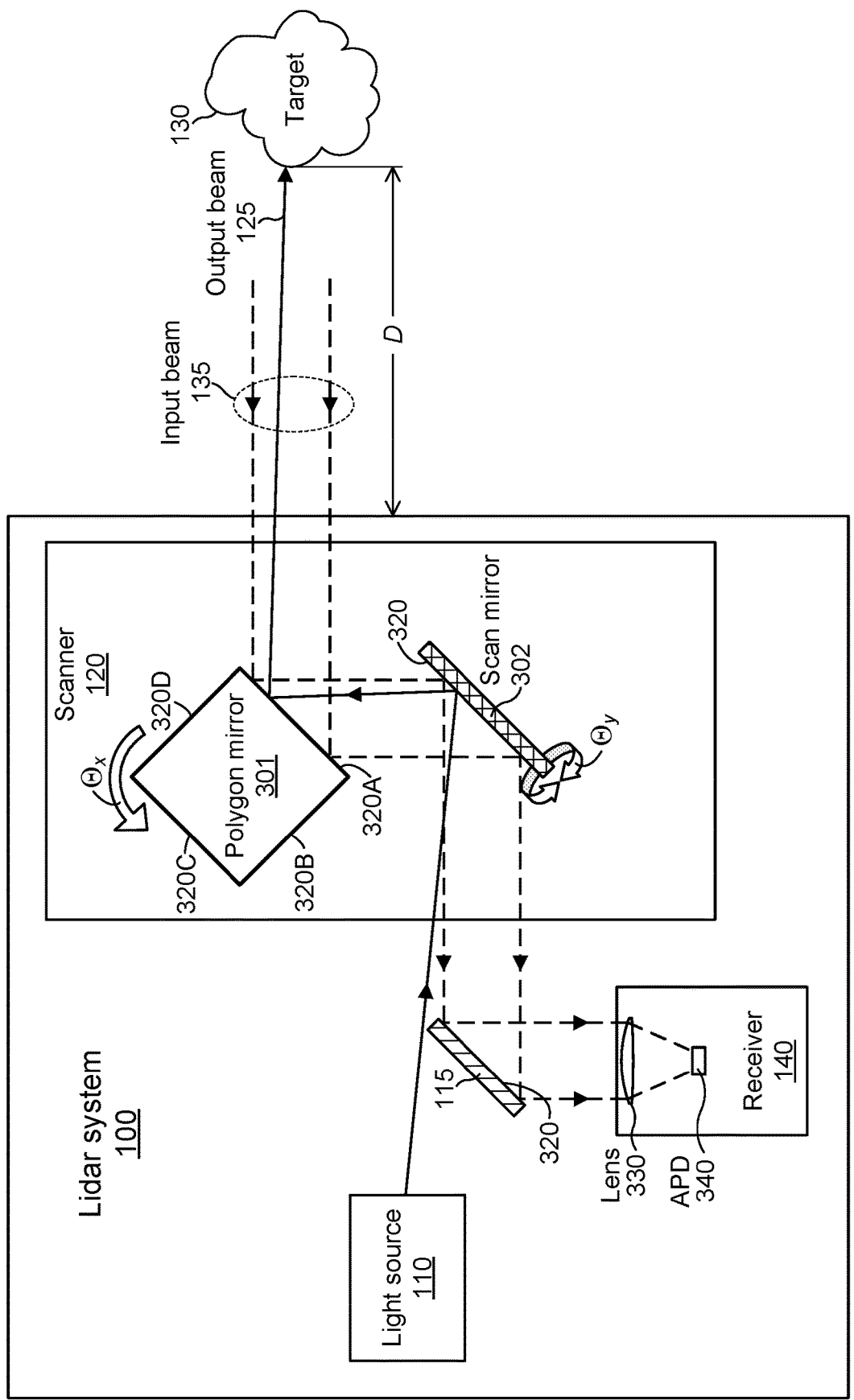
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scanning mirrors: (1) a polygon mirror 301 that rotates along the $\Theta_x$ direction and (2) a scanning mirror 302 that oscillates back and forth along the $\Theta_y$ direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. The detector 340 may be a PN photodiode, a PIN photodiode, an APD, a SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a $\Theta_x$ direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. A polygon mirror 301 may scan an output beam 125 along a direction that is substantially orthogonal to the scan direction of the scan mirror 302. For example, in FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 320 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 320, and then the output beam 125 is directed to the polygon mirror 301, where it is reflected by reflective surface 320A.

Figure 4:
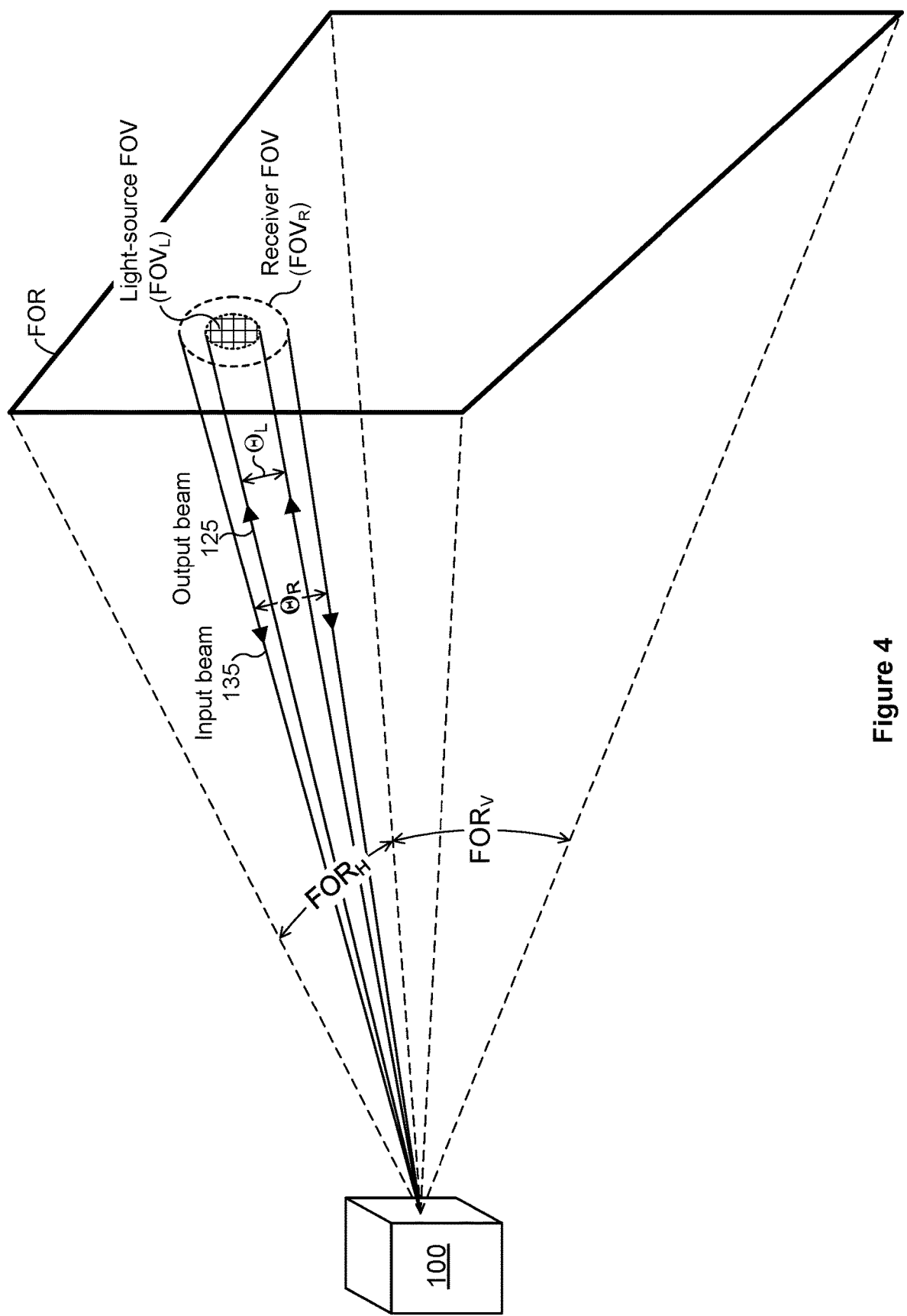
FIG. 4 illustrates an example light-source field of view ($FOV_L$) and receiver field of view ($FOV_R$) for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
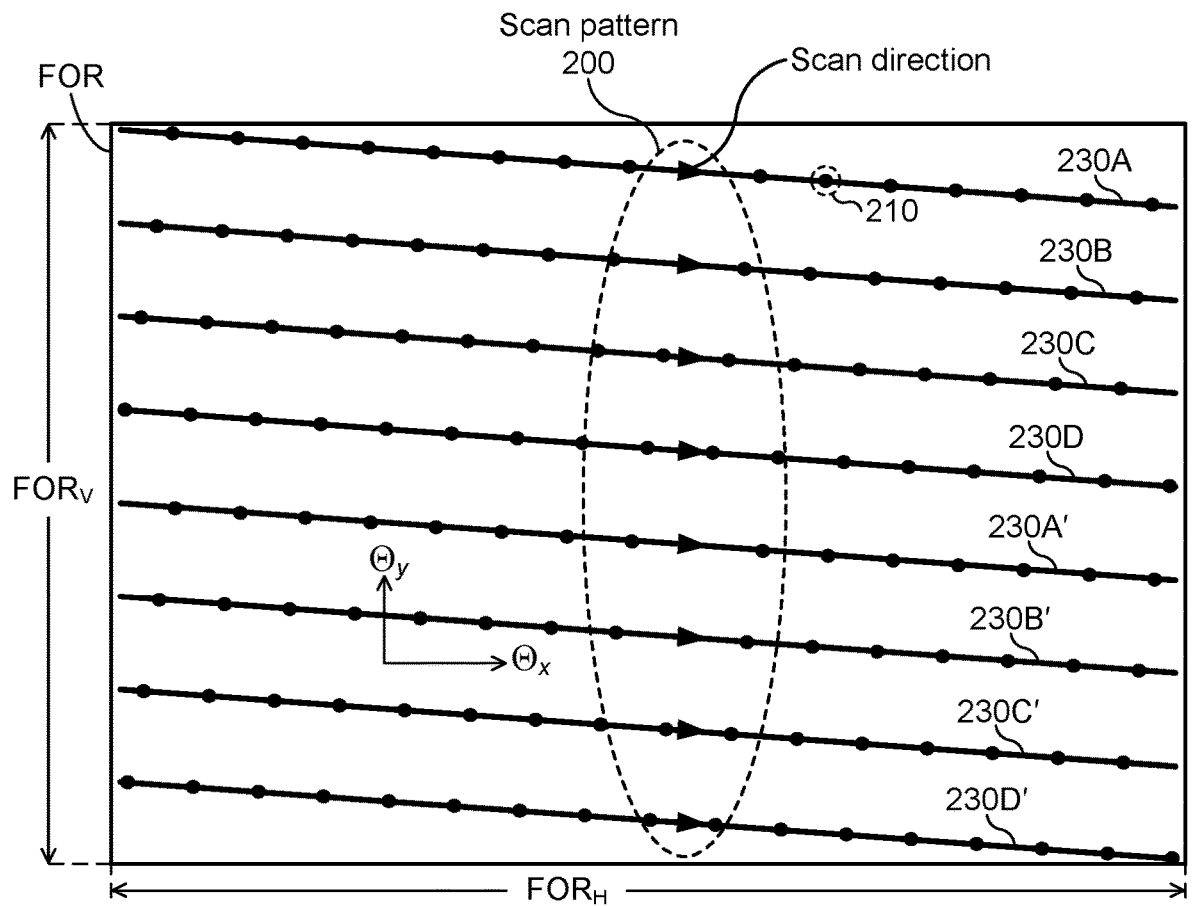
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. A polygon mirror 301 may be configured to scan an output beam 125 across a field of regard as a series of scan lines 230. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of a N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 5.

Figure 6:
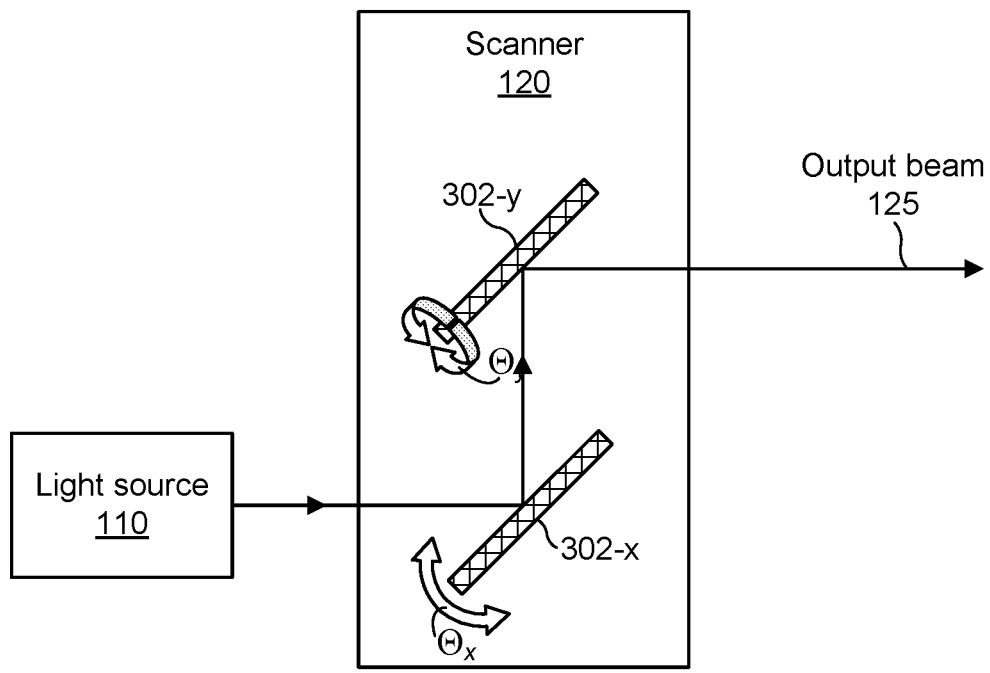
FIG. 6 illustrates an example scanner with two single-axis scan mirrors.

FIG. 6 illustrates an example scanner 120 with two single-axis scan mirrors (302-$x$ and 302-$y$). The light source 110 and scanner 120 illustrated in FIG. 6 may be part of a lidar system 100 in which the scanner 120 scans the output beam 125 across a field of regard (FOR) of the lidar system 100. Scan mirror 302-$x$ may receive an output beam 125 from the light source 110 and direct the output beam 125 to scan mirror 302-$y$, and scan mirror 302-$y$ may direct the output beam 125 downrange from the lidar system 100. Each of the single-axis scan mirrors 302-$x$ and 302-$y$ may pivot back and forth about a particular pivot axis to scan the output beam 125 along a particular direction. For example, scan mirror 302-$x$ may scan the output beam 125 along a substantially horizontal direction, and scan mirror 302-$y$ may scan the output beam 125 along a substantially vertically direction. The scan mirrors 302-$x$ and 302-$y$ may each be individually controllable, and the motions of the scan mirrors 302-$x$ and 302-$y$ may be synchronized so that the output beam 125 is scanned across a FOR of the lidar system 100. Scan mirror 302-$x$ or scan mirror 302-$y$ may be driven by a galvanometer scanner, or scan mirror 302-$x$ or scan mirror 302-$y$ may be a MEMS-based scan mirror. For example, both scan mirror 302-$x$ and 302-$y$ may be MEMS-based scan mirrors. As another example, scan mirror 302-$x$ may be a MEMS-based scan mirror, and scan mirror 302-$y$ may be a galvanometer scanner.

Figure 7:
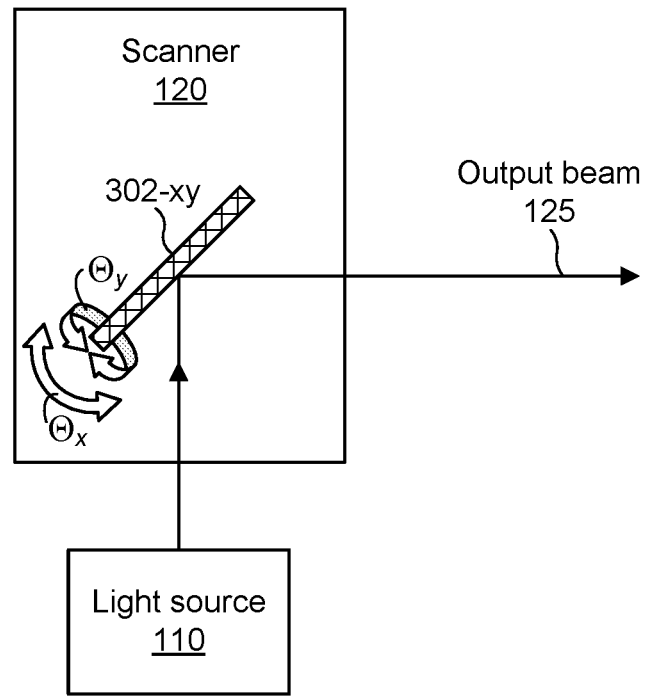
FIG. 7 illustrates an example scanner with one dual-axis scan mirror.

FIG. 7 illustrates an example scanner 120 with one dual-axis scan mirror 302-$xy$. The light source 110 and scanner 120 illustrated in FIG. 7 may be part of a lidar system 100 in which the scanner 120 scans the output beam 125 across a FOR of the lidar system 100. Scan mirror 302-$xy$ may receive an output beam 125 from the light source 110 and direct the output beam 125 downrange from the lidar system 100. Instead of having two single-axis scan mirrors, a scanner 120 may include a dual-axis scan mirror 302-$xy$ that pivots about two axes to scan an output beam 125 along two directions. For example, the scan mirror 302-$xy$ may include a single mirror that is pivoted about a first axis to scan the output beam 125 along a substantially horizontal direction and pivoted about a second axis to scan the output beam along a substantially vertical direction. Scan mirror 302-$xy$ may be a MEMS-based scan mirror.

In particular embodiments, a scanner 120 may include one or more MEMS-based scan mirrors. For example, the single-axis scan mirrors 302-$x$ and 302-$y$ in FIG. 6 may each be MEMS devices, or the dual-axis scan mirror 302-$xy$ in FIG. 7 may be a MEMS device. As another example, the scan mirror 302 in FIG. 3 may be a MEMS device. The scan mirrors of a MEMS-based scanner 120 may be fabricated using semiconductor-fabrication techniques (e.g., deposition, lithography, and etching) and may include or may be made from any suitable material, such as for example, silicon, metal, or ceramic. The scan mirrors of a MEMS-based scanner 120 may have a dimension (e.g., length, width, or diameter) of between 0.1 mm and 10 mm. For example, the single-axis scan mirrors 302-$x$ and 302-$y$ in FIG. 6 may each have a length or width of between 0.5 mm and 2.0 mm. Similarly, the dual-axis scan mirror 302-$xy$ in FIG. 7 may have a diameter of between 0.5 mm and 2.0 mm. As another example, scan mirror 302-$x$ may be a MEMS-based scan mirror with a length or width of 1 mm, and scan mirror 302-$y$ may be a galvanometer-driven mirror with a length or width of 10-20 mm.

Figure 8:
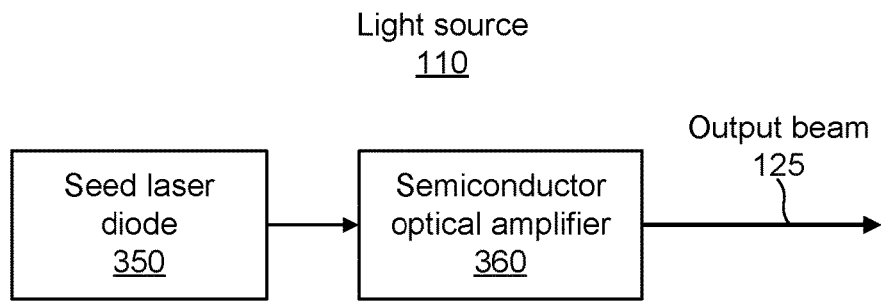
FIG. 8 illustrates an example light source that includes a seed laser diode and a fiber-optic amplifier.

FIG. 8 illustrates an example light source 110 that includes a seed laser diode 350 and a semiconductor optical amplifier (SOA) 360. In particular embodiments, a light source 110 of a lidar system 100 may include (i) a seed laser diode 350 that produces seed optical pulses and (ii) a SOA 360 that amplifies the seed optical pulses and produces an output beam 125 that includes the amplified seed optical pulses. The seed laser diode 350 (which may be referred to as a seed laser or a master oscillator) may include any suitable type of laser diode, such as for example, a Fabry-Perot laser diode, a quantum well laser, a DBR laser, a DFB laser, a VCSEL, or a quantum dot laser diode. A SOA 360 (which may be referred to as a semiconductor amplifier, a semiconductor waveguide amplifier, or a power amplifier) may include a semiconductor optical waveguide that receives seed light from the seed laser diode 350 and amplifies the seed light as it propagates through the optical waveguide. A combination of a seed laser diode 350 and a SOA 360 may be referred to as a master-oscillator power-amplifier (MOPA) or as a semiconductor MOPA. In a MOPA, the seed laser 350 may act as a master oscillator that produces oscillator light (e.g., seed optical pulses), and the SOA 360 may act as an optical power amplifier that amplifies the oscillator light.

Electrical current supplied to a SOA 360 may produce excited electrical carriers (e.g., electrons or holes) in the semiconductor optical waveguide, and the carriers may provide optical gain for the seed light through stimulated emission of photons. An electronic driver may supply pulses of electrical current to the seed laser diode 350 to produce seed optical pulses. Additionally, the electronic driver may supply pulses of electrical current to the SOA 360. The pulses of current supplied to the seed laser diode 350 and the SOA 360 may be supplied synchronously (e.g., at approximately the same frequency) so that each pulse of current supplied to the SOA 360 may cause a corresponding seed optical pulse to be amplified. Each seed optical pulse may have a relatively low pulse energy (e.g., a pulse energy of approximately 1 pJ, 10 pJ, 50 pJ, or 100 pJ), and a SOA 360 may provide any suitable amount of optical gain to seed optical pulses, such as for example, an optical gain of approximately 20 dB, 30 dB, 40 dB, or 50 dB. For example, the seed laser diode 350 may produce optical pulses with a 20-pJ pulse energy, and the output beam 125 may include optical pulses with a 0.2-0 pulse energy, which corresponds to a gain of 40 dB supplied by the SOA 360.

In particular embodiments, a SOA 360 may include a constant-width optical waveguide or a tapered-width optical waveguide. An optical waveguide with a constant width may have a substantially fixed width (e.g., a width of approximately 10 µm, 50 µm, 100 µm, 200 µm, 500 µm, or 1 mm). A tapered optical waveguide may extend from an input end to an output end of the SOA 360, and a width of the tapered waveguide may increase from the input end towards the output end. The width of the tapered waveguide may increase in a uniform or linear manner, for example, from a width at the input end of approximately 1 µm, 2 µm, 5 µm, 10 µm, or 50 µm to a width at the output end of approximately 50 µm, 100 µm, 200 µm, 500 µm, or 1 mm. Seed optical pulses produced by the seed laser diode 350 may be coupled into the tapered waveguide through the input end, and the seed optical pulses may be amplified while propagating along the tapered waveguide to the output end. The amplified seed optical pulses may be emitted from the output end of the tapered waveguide. A light source 110 may include a lens that collects and collimates the emitted light to produce a collimated free-space output beam 125 that is directed to a scanner 120.

In particular embodiments, a seed laser diode 350 and a SOA 360 may be integrated together and disposed on or in a single chip or substrate. A seed laser diode 350 and a SOA 360 being disposed on or in a single chip or substrate may refer to a seed laser diode 350 and a SOA 360 that are each fabricated separately and then attached to the same substrate (e.g., using epoxy or solder). Alternatively, a seed laser diode 350 and a SOA 360 that are disposed on or in a single chip or substrate may be fabricated together on the same substrate. For example, a seed laser diode 350 and SOA 360 may be fabricated on a substrate using semiconductor-fabrication techniques, such as for example, deposition, lithography, or etching. The seed laser diode 350, the SOA 360, and the substrate together may be referred to as a chip in which the seed laser diode 350 and the SOA 360 are disposed. In particular embodiments, a substrate may be electrically or thermally conductive, and a substrate may have a coefficient of thermal expansion (CTE) that is approximately equal to the CTE of the seed laser 350 and the SOA 360. For example, a substrate may include indium phosphide (InP), and the seed laser diode 350 and the SOA 360 may each include InGaAs or InGaAsP semiconductor structures that are grown on the InP substrate. As another example, a substrate may include gallium arsenide (GaAs), and the seed laser diode 350 and the SOA 360 may each include AlGaAs semiconductor structures that are grown on the GaAs substrate. In particular embodiments, a seed laser diode 350 and a SOA 360 may be directly coupled together so that seed optical pulses are directly coupled from the seed laser diode 350 into the waveguide of the SOA 360. Alternatively, the seed laser diode 350 and the SOA 360 may be coupled together by a connecting passive optical waveguide that couples the seed optical pulses from the seed laser diode 350 to the SOA 360. In either case, the seed laser diode 350 and the SOA 360 being integrated together may refer to the seed laser diode 350 and the SOA 360 being coupled together without an air gap between the two devices (e.g., the seed optical pulses do not propagate through an air gap).

Figure 9:
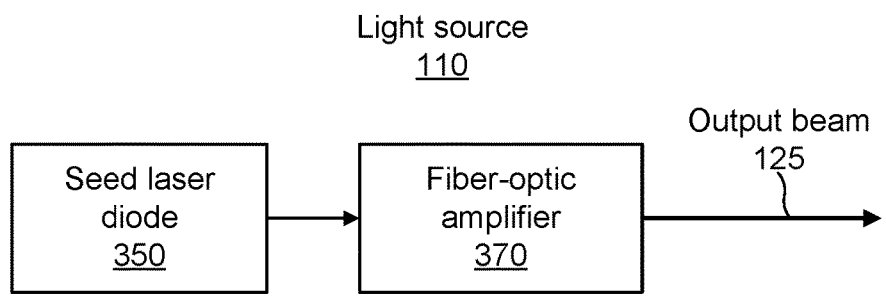
FIG. 9 illustrates an example light source that includes a seed laser diode and a semiconductor optical amplifier (SOA).

FIG. 9 illustrates an example light source 110 that includes a seed laser diode 350 and a fiber-optic amplifier 370. In particular embodiments, a light source 110 of a lidar system 100 may include (i) a seed laser diode 350 that produces seed optical pulses and (ii) a fiber-optic amplifier 370 that amplifies the seed optical pulses and produces an output beam 125 that includes the amplified seed optical pulses. For example, an electronic driver may supply pulses of electrical current to the seed laser diode 350, and each pulse of current may produce a seed optical pulse. The seed optical pulses may be coupled from the seed laser diode 350 into an optical fiber that conveys the seed optical pulses to the fiber-optic amplifier 370. The fiber-optic amplifier 370 may include one or more gain stages, where each gain stage may include an optical gain fiber that (i) is optically pumped by one or more pump laser diodes and (ii) provides optical gain to each seed optical pulse while it propagates through the optical gain fiber. Each seed optical pulse may have a relatively low pulse energy (e.g., a pulse energy of approximately 1 pJ, 10 pJ, 50 pJ, or 100 pJ), and the fiber-optic amplifier 370 may supply an optical gain of approximately 20 dB, 30 dB, 40 dB, 50 dB, 60 dB, or any other suitable amount of optical gain. For example, the seed laser diode 350 may produce optical pulses with a 5-pJ pulse energy, and the output beam 125 may include optical pulses with a 0.5-0 pulse energy, which corresponds to a gain of 50 dB supplied by the fiber-optic amplifier 370. The gain of 50 dB may be achieved by a first gain stage with a 30-dB gain followed by a second gain stage with a 20-dB gain.

Figure 10:
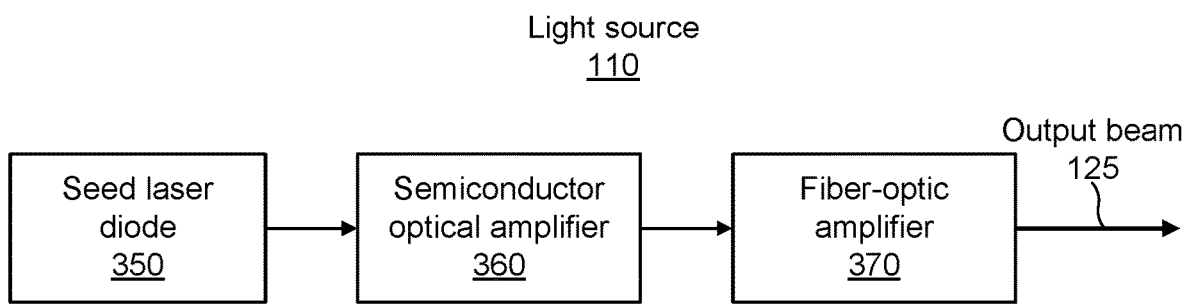
FIG. 10 illustrates an example light source that includes a seed laser diode, a semiconductor optical amplifier (SOA), and a fiber-optic amplifier.

FIG. 10 illustrates an example light source that includes a seed laser diode 350, a semiconductor optical amplifier (SOA) 360, and a fiber-optic amplifier 370. In particular embodiments, a light source 110 of a lidar system 100 may include (i) a seed laser diode 350 that produces seed optical pulses, (ii) a SOA 360 that amplifies the seed optical pulses to produce amplified seed optical pulses, and (iii) a fiber-optic amplifier 370 that further amplifies the amplified seed optical pulses and produces an output beam 125 that includes the further amplified seed optical pulses. The seed laser diode 350 and the SOA 360 may be integrated together, and the amplified seed optical pulses may be conveyed to the fiber-optic amplifier 370 by an optical fiber that receives the amplified seed optical pulses emitted by the SOA 360. The SOA 360 and the fiber-optic amplifier 370 may each provide any suitable amount of optical gain to seed optical pulses, such as for example, an optical gain of approximately 20 dB, 30 dB, 40 dB, or 50 dB. For example, the SOA 360 may provide 30 dB of optical gain to the seed optical pulses, and the fiber-optic amplifier 370 may provide 20 dB of optical gain to the amplified seed optical pulses, which corresponds to an overall gain of 50 dB. As another example, a 5-pJ pulse of seed light may be amplified by the SOA 360 to produce a 5-nJ pulse of amplified seed light, corresponding to a gain of 30 dB. The fiber-optic amplifier 370 may further amplify the 5-nJ pulse of light by 20 dB to produce an emitted pulse of light (which may be part of the output beam 125) with an energy of approximately 0.5 µJ.

In particular embodiments, a lidar system 100 may be a pulsed lidar system where the light source 110 emits an output beam 125 with optical pulses having one or more of the following optical characteristics: a wavelength between 900 nm and 1700 nm; a pulse energy between 0.01 µJ and 100 µJ; a pulse repetition frequency between 80 kHz and 10 MHz; and a pulse duration between 1 ns and 100 ns. For example, light source 110 in FIG. 8, FIG. 9, or FIG. 10 may emit a free-space output beam 125 with optical pulses having a wavelength of approximately 1550 nm, a pulse energy of approximately 0.5 µJ, a pulse repetition frequency of approximately 600 kHz, and a pulse duration of approximately 5 ns. As another example, a light source 110 may emit pulses of light having a wavelength from approximately 1500 nm to approximately 1510 nm. As another example, a light source 110 may emit pulses of light having a wavelength of approximately 905 nm, 1400 nm, 1480 nm, 1505 nm, 1530 nm, 1550 nm, 1555 nm, 1600 nm, or any other suitable wavelength. In the example of FIG. 8, the seed laser diode 350 may produce seed optical pulses with a pulse energy of approximately 100 pJ, and the SOA 360 may amplify the seed optical pulses to produce an output beam 125 with optical pulses having a pulse energy of approximately 250 nJ. In the example of FIG. 10, the seed laser diode 350 may produce seed optical pulses with a pulse energy of approximately 5 pJ, the SOA 360 may amplify the seed optical pulses to produce amplified seed optical pulses having a pulse energy of approximately 10 nJ, and the fiber-optic amplifier 370 may further amplify the pulses to produce an output beam 125 with optical pulses having a pulse energy of approximately 1.0 µJ.

Figure 11:
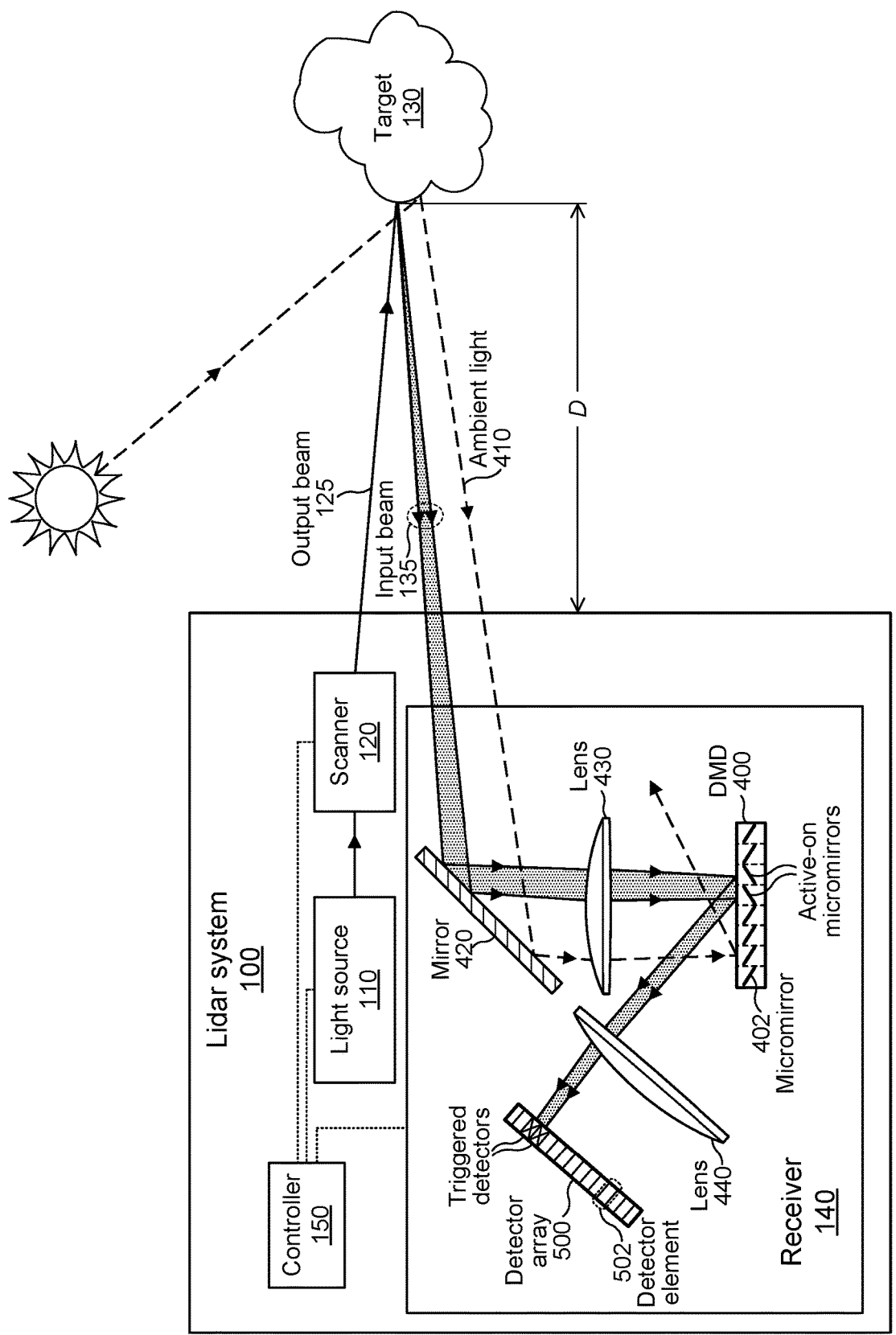
FIG. 11 illustrates an example lidar system with a receiver that includes a digital micromirror device (DMD) and a detector array.

FIG. 11 illustrates an example lidar system 100 with a receiver 140 that includes a digital micromirror device (DMD) 400 and a detector array 500. In particular embodiments, a lidar system 100 may include (i) a light source 110 that emits pulses of light, (ii) a scanner 120 that directs the emitted pulses of light into a FOR of the lidar system 100, and (iii) a receiver 140 that receives a portion of one or more of the emitted pulses of light scattered by a target 130 located a distance D from the lidar system 100. The lidar system 100 may also include a processor (e.g., controller 150). The processor may determine, based at least in part on an electrical signal produced by the receiver 140, that a received pulse of light is associated with an emitted pulse of light. Additionally or alternatively, the processor may determine the distance D from the lidar system 100 to the target 130 based at least in part on a round-trip time for an emitted pulse of light to travel from the lidar system to the target 130 and back to the lidar system 100.

In particular embodiments, a receiver 140 of a lidar system 100 may include (i) a digital micromirror device (DMD) 400 and (ii) a detector array 500. A DMD 400, which may be referred to as a spatial light modulator (SLM), may include a two-dimensional array of electrically addressable micromirrors 402. A portion of the micromirrors 402 may be set to an active-on state to direct a received pulse of light to the detector array 500. The detector array 500 may include a two-dimensional array of detector elements 502. The detector array 500 may detect the received pulse of light and produce an electrical signal corresponding to the received pulse of light. Based at least in part on the electrical signal produced by the detector array 500, a processor may determine that the received pulse of light is associated with an emitted pulse of light. A received pulse of light being associated with an emitted pulse of light may correspond to the received pulse of light including light from the emitted pulse of light that is scattered by a target 130. In FIG. 11, the active-on micromirrors 402 reflect the input beam 135 to the detector array 500. The other micromirrors 402 are set to an active-off state, and other input light (e.g., ambient light 410) that is incident on the DMD 400 may be reflected by the active-off micromirrors 402 in a direction away from the detector array 500.

In the example of FIG. 11, the output beam 125 is directed from the light source 110 to the scanner 120, which scans the output beam 125 across a FOR of the lidar system 100. The output beam 125 may include pulses of light, and one of the emitted pulses of light may be scattered by a target 130. A portion of the emitted pulse of light scattered by the target 130 may be directed back to the lidar system as part of an input beam 135. The input beam 135 may be directed to the receiver 140 without first passing through the scanner 120. The receiver 140 may include a turning mirror 420 that directs the input beam 135 to the DMD 400 or an input lens 430 that focuses the input beam 135 onto the DMD 400. For example, the input lens 430 may focus the input beam 135 onto the DMD 400 to a beam spot with a diameter of approximately 10 µm, 20 µm, 50 µm, 100 µm, 200 µm, or 500 µm. The micromirrors 402 that are set to the active-on state may reflect the input beam 135 and direct the input beam 135 to the detector array 500. The receiver 140 may include a lens 440 that focuses the input beam 135 onto the detector array 500. A portion of the detector elements 502 of the detector array 500 may be triggered by light from the input beam 135, where the triggered detectors indicate detection of a received pulse of light. The detector array 500 may produce an electrical signal corresponding to the received pulse of light, and the electrical signal may be sent to a processor.

In the example of FIG. 11, the scanner 120 only scans the output beam 125, and the input beam 135 bypasses the scanner 120. The output beam 125 may have a diameter of approximately 0.5 mm, 1 mm, 2 mm, or 5 mm. The input beam 135 may have a diameter of approximately 1 mm, 5 mm, 10 mm, 20 mm, or 30 mm, and the diameter of the input beam 135 may be larger than the diameter of the output beam 125. By configuring the lidar system 100 so that the input beam 135 does not pass through the scanner 120, the scan mirrors of the scanner 120 may have smaller dimensions (as compared to scan mirrors of a conventional scanner through which both an output beam 125 and an input beam 135 pass). In FIG. 1, both the output beam 125 and the input beam 135 may pass through the scanner 120, and the scan mirrors of the scanner 120 may have a length, width, or diameter of approximately 10-30 mm. In FIG. 11, since the input beam 135 bypasses the scanner 120, the scan mirrors of the scanner 120 may have a length, width, or diameter of less than or equal to 10 mm. For example, the scanner 120 in FIG. 11 may include two galvanometer-driven scan mirrors, each mirror having a length or width of less than or equal to 10 mm. As another example, the scanner 120 in FIG. 11 may include a polygon mirror 301 and a galvanometer-driven scan mirror, where the galvanometer-driven scan mirror and the reflective surfaces of the polygon mirror 301 each have a length or width of less than or equal to 10 mm.

In particular embodiments, a scanner 120 may be a MEMS-based scanner with one or more MEMS-based scan mirrors. For example, the scanner 120 in FIG. 11 may include one or more MEMS-based scan mirrors with a length, width, or diameter of approximately 1-2 mm. As another example, the scanner 120 in FIG. 11 may include one MEMS-based scan mirror with a length, width, or diameter of approximately 1-2 mm, and one galvanometer-driven scan mirror with a length, width, or diameter of approximately 10 mm. The MEMS-based mirror may scan the output beam relatively rapidly across the FOR of the lidar system 100, for example, at a scan rate of approximately 10 Hz, 20 Hz, 50 Hz, 100 Hz, 500 Hz, 1 kHz, or 5 kHz. The galvanometer-driven mirror may scan the output beam in a direction approximately orthogonal to the scan direction of the MEMS-based scan mirror, and the galvanometer-driven mirror may be scanned at a lower scan rate (e.g., a scan rate of approximately 0.1 Hz, 1 Hz, 10 Hz, 20 Hz, or 50 Hz).

Figure 12:
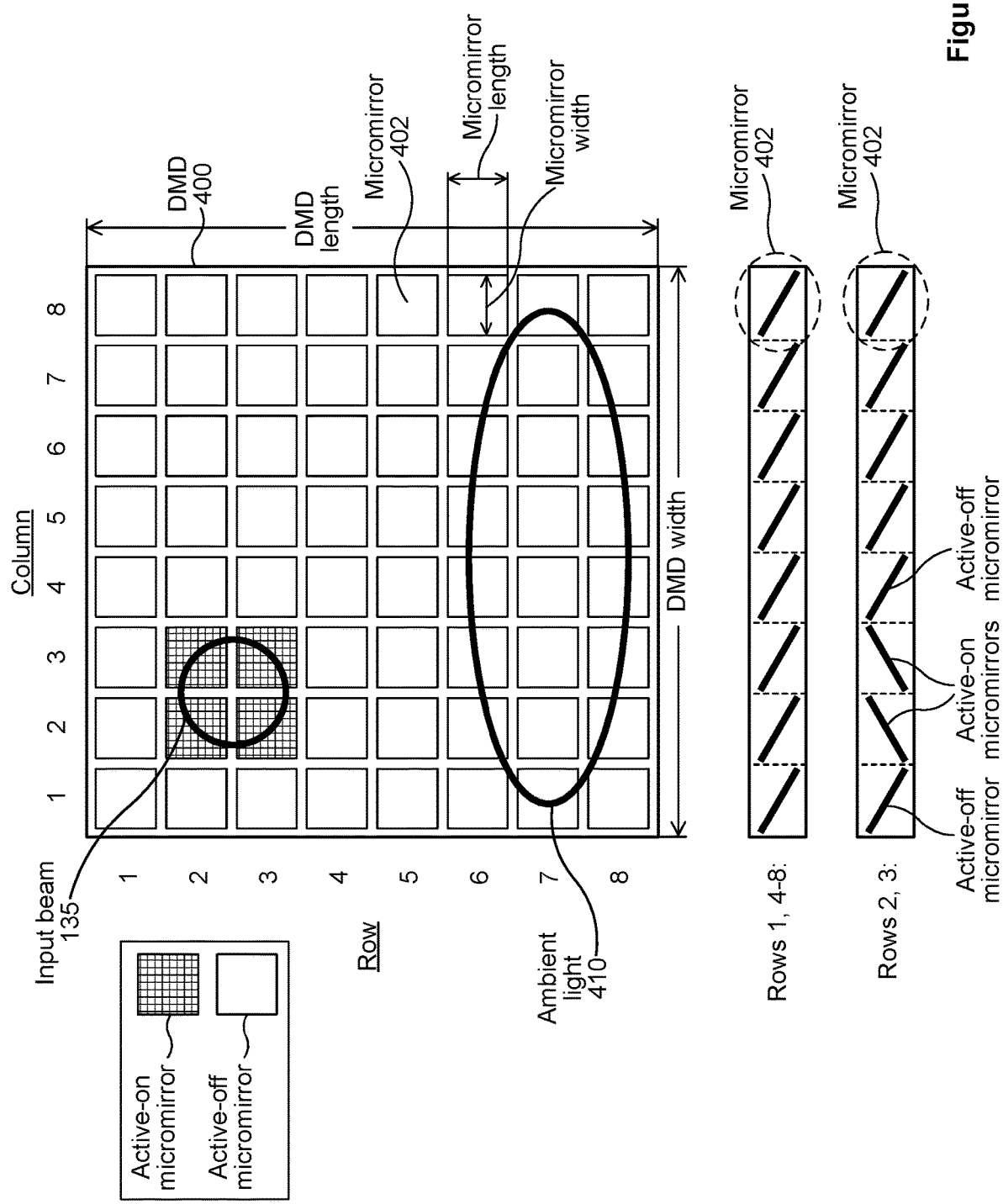
FIG. 12 illustrates a top view of an example digital micromirror device (DMD) along with two side views of rows of the DMD.

FIG. 12 illustrates a top view of an example digital micromirror device (DMD) 400 along with two side views of rows of the DMD. A DMD 400, which may be referred to as a micro-opto-electro-mechanical system (MOEMS) device, may include any suitable number of micromirrors 402 arranged in a two-dimensional array. For example, a DMD 400 may include approximately $10^2$, $10^3$, $10^4$, $10^5$, $10^6$, or $10^7$ micromirrors 402. As another example, a DMD 400 may include 500,000 micromirrors 402 arranged in an array with 500 rows and 1000 columns. The DMD 400 in FIG. 12 includes 64 micromirrors 402 arranged in an array with eight rows and eight columns. The micromirrors 402 of a DMD 400 may have a substantially round, oval, square, or rectangular shape with any suitable length, width, or diameter, such as for example, a length, width, or diameter of approximately 1 μm, 2 μm, 5 μm, 10 μm, or 20 μm. A DMD 400 may have any suitable length or width, such as for example, a length or width of approximately 1 mm, 2 mm, 5 mm, 10 mm, 20 mm, or 50 mm. For example, a DMD 400 with 408,000 micromirrors 402 arranged in a 480×850 array may have a length of approximately 3 mm and a width of approximately 5 mm.

Each micromirror 402 of a DMD 400 may include a mirror element attached to a hinge or pivoting element that allows the mirror element to pivot to an active-on state or an active-off state. For example, in an active-on state, a mirror element may be oriented at an angle of +15 degrees relative to a plane of the DMD 400. In an active-off state, the mirror element may be oriented at a −15-degree angle. Each micromirror 402 of a DMD 400 may be independently set to the active-on state or the active-off state by an electric signal that causes a force to be applied to the mirror element using electromagnetic or electrostatic actuation. For example, an electrical signal (e.g., a voltage of +5 V) applied to a first electrode of a micromirror 402 may cause the micromirror 402 to be set to the active-on state, and another electrical signal (e.g., a voltage applied to a second electrode of the micromirror 402) may cause the micromirror 402 to switch to the active-off state. Each mirror element may have a reflective surface that reflects incident light. Each mirror element of a micromirror 402 may have a length, width, or diameter that is less than or equal to a corresponding length, width, or diameter of the micromirror 402. For example, a micromirror 402 may have a square shape with a side length of 10 μm, and the mirror element of the micromirror 402 may have a length or width of approximately 8 μm.

In particular embodiments, each micromirror 402 of a DMD 400 may be set to an active-on state or an active-off state. For example, a processor may send instructions to the DMD 400 indicating the state to which each micromirror 402 should be set. At least some of the active-on micromirrors 402 may reflect an input beam 135 (which may include a received pulse of light) to a detector array 500. Any suitable number of micromirrors 402 of a DMD 400 may be set to an active-on state (e.g., approximately 1, 5, 10, 50, 100, $10^3$, $10^4$, or $10^5$ micromirrors 402 may be set to the active-on state). For example, an input beam 135 may be focused to a 50-μm diameter spot on a DMD 400, and a square section of 20×20 micromirrors 402 associated with the region where the input-beam spot is incident on the DMD 400 may be set to the active-on state. In the example of FIG. 12, four micromirrors 402 are set to the active-on state, and the other 60 micromirrors 402 are set to the active-off state. As indicated by the side views of the rows of the DMD 400, the second and third micromirrors 402 in row 2 and row 3 are each set to the active-on state. The surrounding micromirrors 402 in rows 2 and 3 and all the micromirrors 402 in row 1 and rows 4-8 are set to the active-off state.

In particular embodiments, each of the micromirrors 402 of a DMD 400 set to an active-on state may be associated with a region of the DMD 400 where a received pulse of light is incident on the DMD 400. For example, each of the active-on micromirrors 402 may be located near or may be overlapped with the region of the DMD 400 where a received pulse of light is incident on the DMD 400. In FIG. 12, the four active-on micromirrors 402 are associated with the region of the DMD 400 where the input beam 135 is incident on the DMD 400. The input beam 135 may include a received pulse of light, and the active-on micromirrors 402 may reflect the received pulse of light to a detector array 500. The region of a DMD 400 where a received pulse of light (which is part of an input beam 135) is incident on the DMD 400 may be referred to as a region of incidence.

In particular embodiments, micromirrors 402 of a DMD 400 that are not associated with a region of the DMD 400 where a received pulse of light is incident on the DMD 400 may be set to an active-off state. For example, micromirrors 402 that are not located near or within the region of incidence may be set to the active-off state. The active-off micromirrors 402 may reflect other input light (e.g., ambient light 410) that is incident on the DMD 400 in a direction away from the detector array 500. Ambient light 410 may include sunlight, light from vehicle headlights, or light from other lidar sensors. In FIG. 12, the ambient light 410 incident on rows 6, 7, and 8 of the DMD 400 may be reflected by the active-off micromirrors 402 and directed away from the detector array 500. By diverting most of the ambient light 410 away from the detector array 500, the amount of background optical noise received by the detector array 500 may be reduced, which may improve the sensitivity of the receiver 140 (e.g., by improving the ability of the detector array 500 to detect relatively weak optical pulses).

Figure 13:
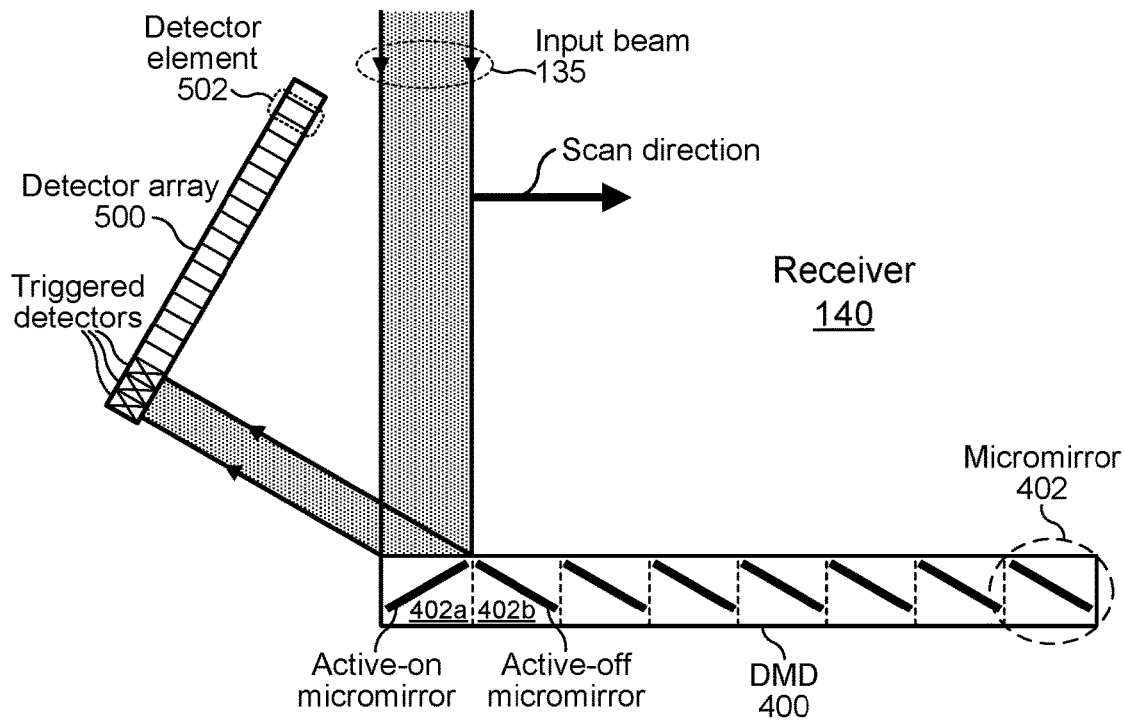
FIGS. 13 and 14 each illustrate a side view of an example digital micromirror device (DMD) with an input beam that is incident on the DMD.
Figure 14:
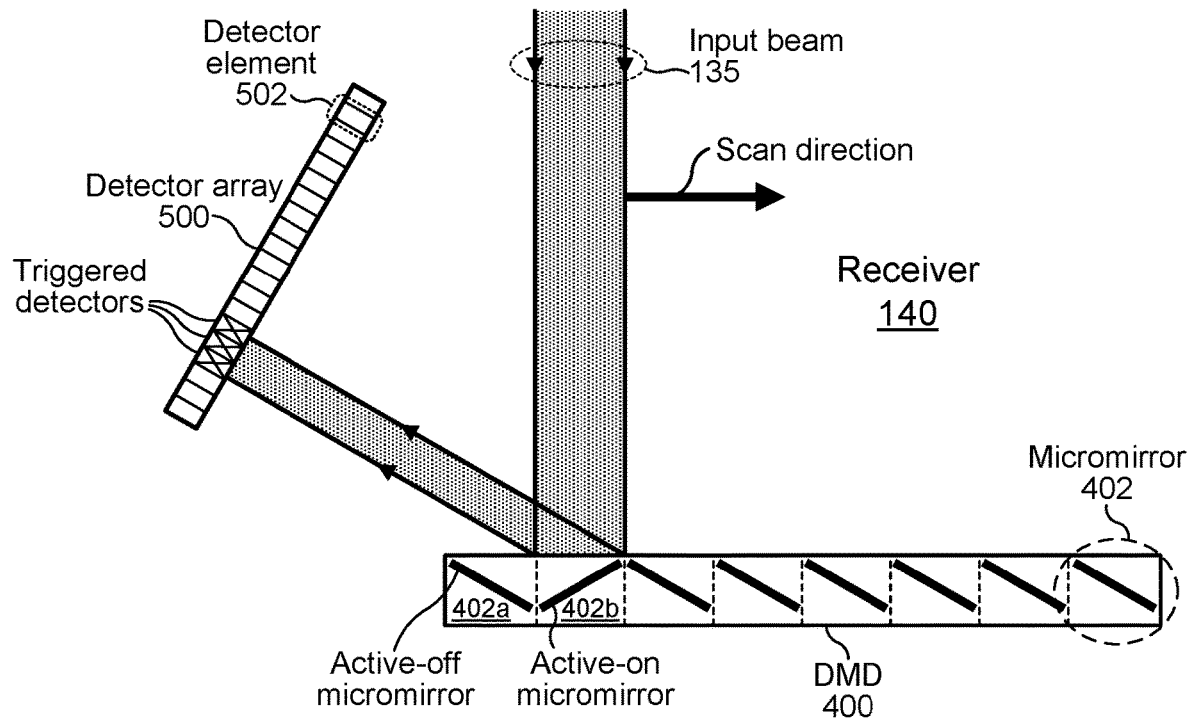

FIGS. 13 and 14 each illustrate a side view of an example digital micromirror device (DMD) 400 with an input beam 135 that is incident on the DMD. The DMD 400 may be part of a receiver 140 of a lidar system 100, and the input beam 135 may include scattered light from pulses of light emitted by a light source 110 of the lidar system 100. In particular embodiments, a processor (e.g., controller 150) may send instructions to a DMD 400 to (i) set one or more active-on micromirrors 402 of a DMD 400 to an active-off state, (ii) set one or more active-off micromirrors 402 to an active-on state, or (iii) apply no change in state to one or more micromirrors 402. In response to the light source 110 emitting pulses of light or in response to the output beam 125 being scanned across a FOR, the processor may switch particular micromirrors 402 from active-on to active-off and may switch other particular micromirrors 402 from active-off to active-on. Additionally, other micromirrors 402 may be left in their current state and not switched. The micromirrors 402 may be switched dynamically as the light source 110 emits pulses of light or as the output beam 125 is scanned across the FOR by a scanner 120. For example, micromirrors 402 associated with a region of the DMD 400 where a received pulse is expected to be incident on the DMD 400 may be switched to (or may remain in) an active-on state, and other micromirrors 402 not associated with the region of incidence may be switched to (or may remain in) an active-off state. As the output beam 125 is scanned across the FOR, the region of incidence of the input beam 135 (and received pulses of light) may move across the DMD 400 in a manner related to how the output beam 125 is scanned, and particular micromirrors 402 may be switched to active-on or active-off in accordance with the location of the input beam 135.

In FIG. 13, micromirror 402a is in an active-on state, and micromirror 402b is in an active-off state. A light source 110 may emit a first pulse of light, and the input beam 135 may include a first received pulse of light that is associated with the first emitted pulse of light (e.g., the first received pulse of light may include a portion of the first emitted pulse of light scattered by a target 130). The input beam 135 may be directed by micromirror 402*a* to the detector array 500, and three detectors 502 of the detector array 500 may be triggered in response to detecting the first received pulse of light. At a later time (e.g., 1-2 microseconds after emitting the first pulse of light), the light source 110 may emit a second, subsequent pulse of light. The second emitted pulse of light may be directed by a scanner 120 into the FOR at a different angle from the first emitted pulse of light, and as a result, the input beam 135 may be directed to a different region of the DMD 400. In FIG. 14, in response to the input beam 135 being directed to a different region of incidence, micromirror 402*a* has been switched to the active-off state, and micromirror 402*b* has been switched to the active-on state. The input beam 135 may include a second received pulse of light that is associated with the second emitted pulse of light. The input beam 135 may be directed by micromirror 402*b* to the detector array 500, and three other detectors 502 of the detector array 500 may be triggered in response to detecting the second received pulse of light. This process may continue as (i) the light source emits additional pulses of light that are scanned as an output beam 125 across the FOR by the scanner 120 and (ii) the input beam 135 moves across the DMD 400 in a scan direction in accordance with the scan pattern of the output beam 125. While FIGS. 13 and 14 illustrate two micromirrors 402 whose states are switched, the region of incidence of the input beam 135 may overlap any suitable number of micromirrors 402, and any suitable number of micromirrors 402 may be switched as the input beam 135 moves across the DMD 400.

FIGS. 15-18 each illustrate a top view of an example digital micromirror device (DMD) 400 with an input beam that is incident on the DMD. The circle in each of FIGS. 15-18 corresponds to a region of incidence and indicates the beam spot where the input beam 135 (which may include one or more received pulses of light) is incident on the DMD 400. The scan-direction arrow in each of FIGS. 15-18 indicates the direction the input beam 135 travels across the DMD 400 as the output beam 125 is scanned across the FOR of the lidar system 100. A light source 110 of a lidar system 100 may emit an output beam 125 that includes multiple pulses of light, and a scanner 120 of the lidar system 100 may scan the output beam 125 across a scan pattern 200 contained within a FOR of the lidar system 100. Scattered light from the emitted pulses of light may be received as an input beam 135 by a receiver 140 of the lidar system 100, and the input beam 135 may be incident on a DMD 400 of the receiver 140 over a region of incidence. A region of incidence may correspond to a region of the DMD 400 where the input beam 135 (and received pulses of light that are part of the input beam 135) is incident on the DMD 400.

In particular embodiments, a region of incidence of an input beam 135 may move across a surface of a DMD 400 in a pattern that corresponds to a scan pattern 200 of a corresponding output beam 125. Since the input beam 135 includes light from the output beam 125 that is scattered by remote targets 130, as the output beam 125 is scanned across a FOR, the location or orientation of the input beam 135 directed into the receiver 140 may change accordingly. So, as the output beam 125 is scanned along a scan pattern 200, the change in location or orientation of the input beam 135 may cause the region of incidence of the input beam 135 to move across the DMD 400 in a corresponding manner. For example, in FIG. 5, an output beam 125 is scanned across a FOR in a scan pattern 200 that includes a series of scan lines 230, where each scan line is scanned in a particular scan direction. The scan direction of the input beam 135 across the DMD 400 in FIGS. 15 and 16 may correspond to the scan direction of the output beam 125 across the FOR in FIG. 5. Additionally, the region of incidence of the input beam 135 may move across the DMD 400 in a series of lines that correspond to the scan lines 230 traversed by the output beam 125. For example, scan line 230A in FIG. 5 may correspond to the motion of input beam 135 along rows 2 and 3 of the DMD 400 as illustrated by the scan-direction arrow in FIGS. 15 and 16. Similarly, scan line 230B in FIG. 5 may correspond to a subsequent motion (not illustrated in FIGS. 15 and 16) of the input beam 135 along rows 4 and 5 of the DMD 400.

Figure 15:
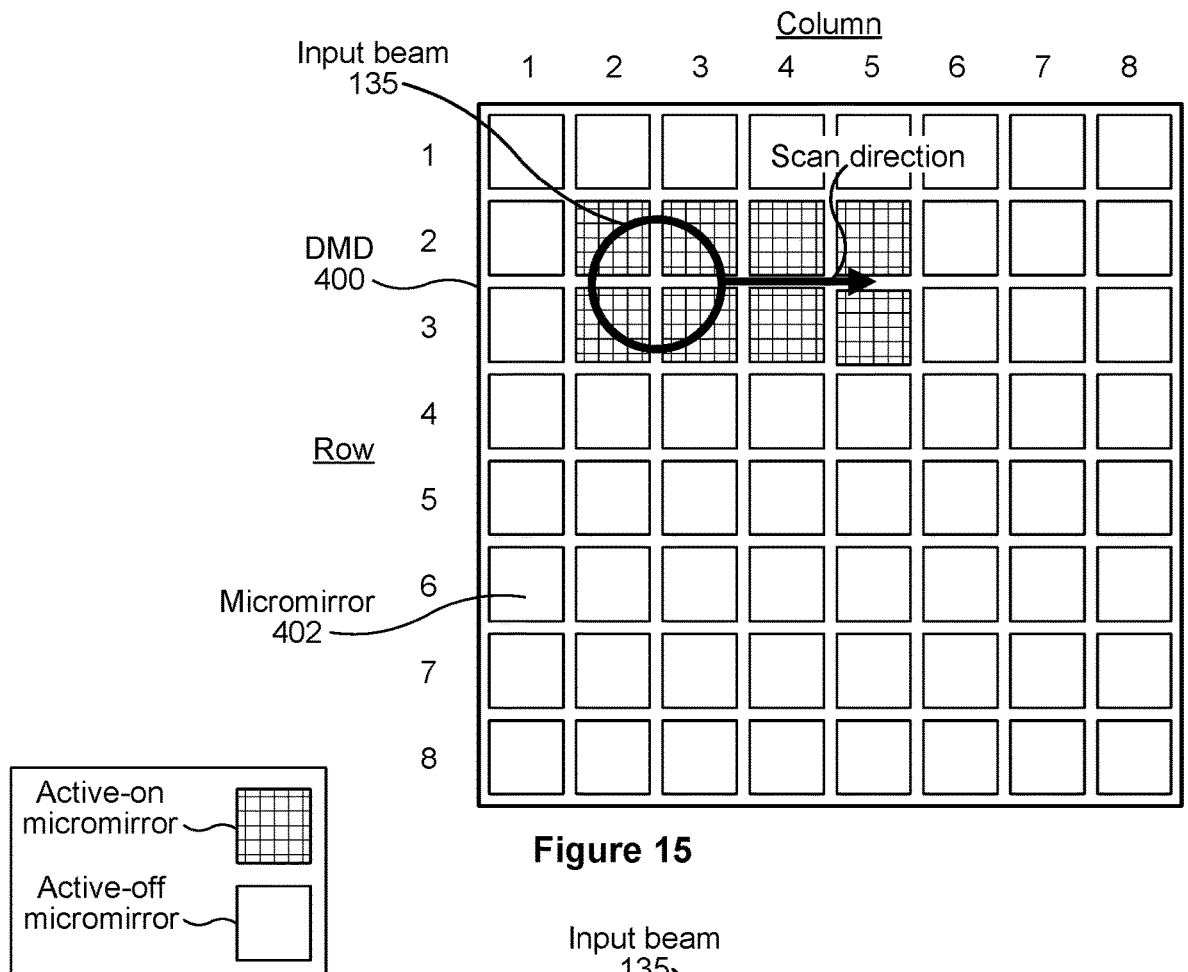
FIGS. 15-18 each illustrate a top view of an example digital micromirror device (DMD) with an input beam that is incident on the DMD.

In particular embodiments, micromirrors 402 that are associated with a region of incidence may be set to an active-on state. Micromirrors 402 associated with a region of incidence may include micromirrors 402 that are located (i) within the region of incidence, (ii) near the region of incidence, or (iii) at a future location of the region of incidence. Other micromirrors 402 that are not associated with a region of incidence may be set to an active-off state. In FIG. 15, the region of incidence of the input beam 135 overlaps the four micromirrors 402 in rows 2-3 and columns 2-3, and the eight active-on micromirrors 402 (in rows 2-3 and columns 2-5) represent micromirrors that are associated with the region of incidence. In particular embodiments, a region of incidence may overlap approximately 1, 5, 10, 50, 100, $10^3$, $10^4$, or $10^5$ micromirrors 402, or any other suitable number of micromirrors 402 of a DMD 400. Additionally, the number of micromirrors 402 of a DMD 400 that are associated with a region of incidence and set to an active-on state may be approximately 1, 5, 10, 50, 100, $10^3$, $10^4$, or $10^5$ micromirrors 402, or any other suitable number of micromirrors 402. The number of micromirrors 402 of a DMD 400 associated with a region of incidence may be greater than or equal to the number of micromirrors that overlap the region of incidence. For example, micromirrors 402 that overlap the current location of a region of incidence may be set to the active-on state. Additionally, micromirrors 402 located near the region of incidence or at a future location of the region of incidence may also be set to the active-on state. In the example of FIG. 15, a total of eight micromirrors (in rows 2-3 and columns 2-5) are associated with the region of incidence and are in the active-on state. The four micromirrors 402 in rows 2-3 and columns 2-3 overlap the region of incidence of the input beam 135 (and may be considered to be located within the region of incidence), and the four micromirrors in rows 2-3 and columns 4-5 are located at a future location of the region of incidence.

Figure 16:
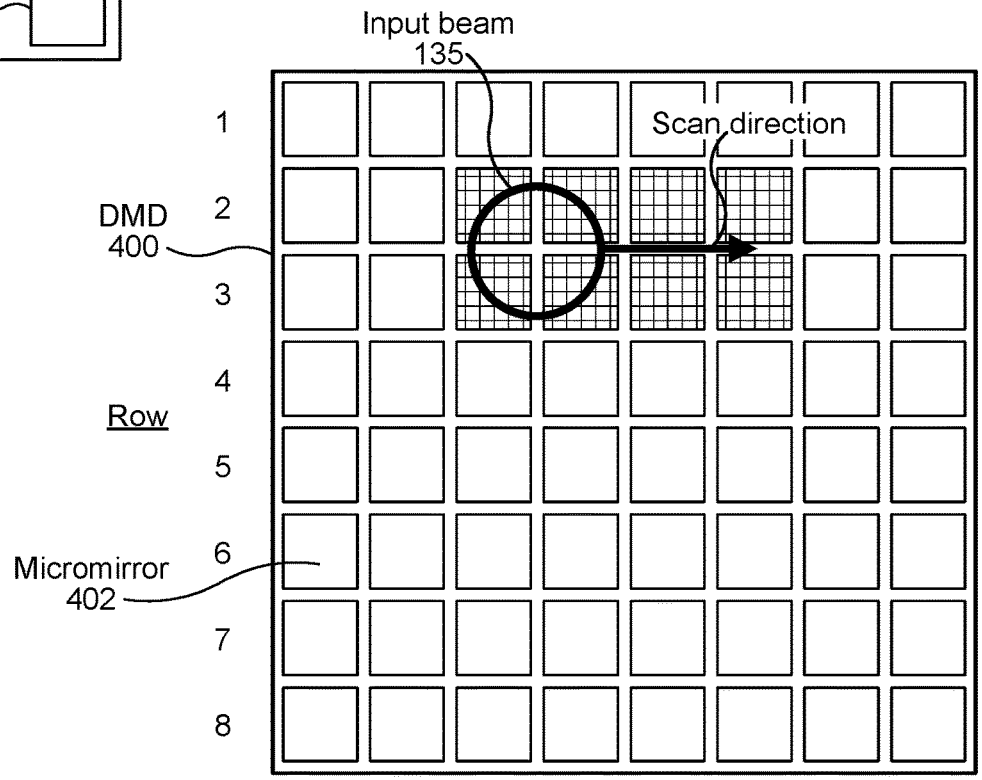

In particular embodiments, micromirrors 402 of a DMD 400 may be dynamically set to an active-on state or an active-off state as a region of incidence moves across the surface of the DMD 400. For example, micromirrors 402 associated with a region of incidence that are located at or near a current or future location of the region of incidence may be switched to the active-on state. As an output beam 125 is scanned along a scan pattern 200 across a FOR, the region of incidence of the input beam 135 may move across the DMD 400 in a corresponding manner, and the micromirrors 402 of the DMD 400 may be dynamically switched based on the current or future location of the input beam 135. Dynamic switching may refer to switching of micromirror states in real time as an output beam 125 is scanned across a FOR and as received pulses of light are detected by a receiver 140. In FIG. 15, the four active-on micromirrors 402 in rows 2-3 and columns 2-3 correspond to the current location of the region of incidence of the input beam 135. Additionally, the four active-on micromirrors 402 in rows 2-3 and columns 4-5 correspond to a future location of the region of incidence. In FIG. 16, the region of incidence of the input beam 135 has moved in the scan direction across the surface of the DMD 400. The two micromirrors 402 in rows 2-3 and column 2 have been dynamically switched from active-on to active-off. Additionally, the two micromirrors 402 in rows 2-3 and column 6 have been dynamically switched from active-off to active-on. The six micromirrors 402 in rows 2-3 and columns 3-5 remain in an active-on state. As the region of incidence moves in the scan direction across the DMD 400, micromirrors 402 are dynamically switched to an active-off state or to an active-on state, depending on the location of each micromirror 402 with respect to the input beam 135. In FIGS. 15 and 16, micromirrors 402 located a particular distance ahead of the region of incidence are switched to an active-on state. When the region of incidence has moved so that a micromirror 402 is located behind the region of incidence, the micromirror 402 may then be switched back to an active-off state.

A light source 110 of a lidar system 100 may emit a first pulse of light, and after a particular time interval (e.g., after one pulse period τ), the light source 110 may emit a second, subsequent pulse of light. The pulses of light may be part of an output beam 125 that is scanned by a scanner 120 in a scan direction across a FOR of the lidar system 100. A receiver 140 may receive light from the first pulse of light scattered by a target 130, and a portion of micromirrors 402 of a DMD 400 set to the active-on state may direct the received first pulse of light to a detector array 500. The portion of micromirrors 402 set to the active-on state may be located in a region of incidence associated with the received first pulse of light. An additional portion of micromirrors 402 may also be set to the active-on state to direct received light from the second pulse of light that is scattered by a target 130. The additional portion of the micromirrors 402 set to the active-on state may be located adjacent to the region of incidence of the received first pulse of light and may be located along a direction associated with the scan direction of the input beam 135 across the DMD 400. Additionally, the additional portion of the micromirrors 402 may be set to the active-on state prior to emission of the second pulse of light. In the example of FIG. 15, the micromirrors in rows 2-3 and columns 2-3 may be set to the active-on state to direct the received first pulse of light to a detector array 500. Additionally, the micromirrors in rows 2-3 and columns 4-5 (which are located adjacent to the region of incidence and along the scan direction of the input beam 135) may be set to the active-on state so that a subsequently received pulse of light (e.g., the received second pulse of light) is directed to the detector array 500.

In particular embodiments, some micromirrors 402 of a DMD 400 may be set to an active-on state prior to a time when a particular pulse of light is emitted by a light source 110. For example, a DMD 400 may have a refresh time (e.g., a time to update the state of the micromirrors 402 in the DMD 400) or the micromirrors 402 may have a switching time (e.g., a time to switch from active-on to active-off, or vice versa) that is greater than the pulse period τ of the light source 110. In order for micromirrors 402 to be set to an active-on state when scattered light from a particular emitted pulse of light is received by the receiver 140, switching of the micromirrors 402 to the active-on state may be initiated prior to emission of the particular pulse of light by the light source 110. The refresh time for a DMD 400 or the switching time for a micromirror 402 may be approximately 5 μs, 10 μs, 20 μs, 30 μs, or 50 μs, and the pulse period for pulses of light emitted by the light source 110 may be less than 10 μs. For example, a light source may have a pulse period of approximately 2 μs, and the micromirror switching time may be approximately 20 μs. In order for particular micromirrors 402 to be set to an active-on state to reflect scattered light from a particular received pulse of light to a detector array 500, switching of the micromirrors 402 to the active-on state may be initiated at least 20 μs prior to emission of the pulse of light. The particular micromirrors 402 that are set to the active-on state may be associated with a region of incidence of the received pulse of light. In the example of FIG. 15, the micromirrors 402 in rows 2-3 and columns 4-5 may be set to the active-on state before emission of a pulse of light that is incident on those micromirrors 402.

In particular embodiments, one or more active-on micromirrors 402 may be set to an active-off state after a received pulse of light is detected by a detector array 500. For example, micromirrors 402 located on a side of the region of incidence opposite the scan direction of the input beam 135 may be set to the active-off state. The scan direction of the input beam 135 across the DMD 400 may correspond to the scan direction of the output beam 125 across the FOR. In FIG. 15, the four active-on micromirrors 402 in rows 2-3 and columns 2-3 may reflect a received pulse of light to a detector array 500 which detects the received pulse of light. After the received pulse of light has been detected, some of the active-on micromirrors 402 may be switched to an active-off state. In FIG. 16, the region of incidence has moved, and the two micromirrors 402 in rows 2-3 and column 2, which are located on the side of the region of incidence opposite the scan direction of the input beam 135, have been switched to the active-off state. After the region of incidence has scanned across an active-on micromirror 402, the micromirror 402 may be switched to an active-off state since that micromirror 402 is not needed to direct a subsequently received pulse of light to the detector array 500.

In particular embodiments, a scanner 120 and a DMD 400 may be operated synchronously where a portion of the micromirrors 402 of the DMD 400 are set to the active-on state based at least in part on the scan angle of the scanner 120. For example, a processor may send instructions to a DMD 400 to set particular micromirrors 402 to the active-on state based at least in part on the scan angle of the output beam 125. Additionally, the processor may send instructions to a DMD 400 to set other particular micromirrors 402 to the active-off state based at least in part on the scan angle of the output beam 125. A scanner 120 may direct an output beam 125 (which may include an emitted pulse of light) into a FOR of a lidar system 100 at a particular scan angle with respect to the lidar system 100, and the output-beam scan angle may change as the output beam 125 is scanned across the FOR. The location of the region of incidence of the input beam 135 on the DMD 400 may depend on the output-beam scan angle, and particular micromirrors 402 of the DMD 400 may be set to the active-on or active-off state based at least in part on the scan angle of the output beam 125. For example, a particular output-beam scan angle may correspond to a particular location of the region of incidence on the DMD 400, and micromirrors 402 located behind the region of incidence (e.g., in a direction opposite the scan direction of the input beam 135) may be set to the active-off state. Additionally or alternatively, micromirrors 402 located within a particular distance or a particular number of micromirrors 402 ahead of the region of incidence along the scan direction may be set to the active-on state. Micromirrors 402 located any suitable distance ahead of the region of incidence may be set to the active-on state (e.g., within a distance of 1, 2, 4, 8, 10, 20, 30, 50, or 100 micromirrors).

In FIG. 15, the micromirrors in rows 2-3 and columns 4-5, which are located ahead of the region of incidence and within a distance of two micromirrors of the region of incidence, are set to the active-on state. Similarly, in FIG. 16, the micromirrors in rows 2-3 and columns 5-6, which are located ahead of the region of incidence and within a distance of two micromirrors, are set to the active-on state.

Figure 17:
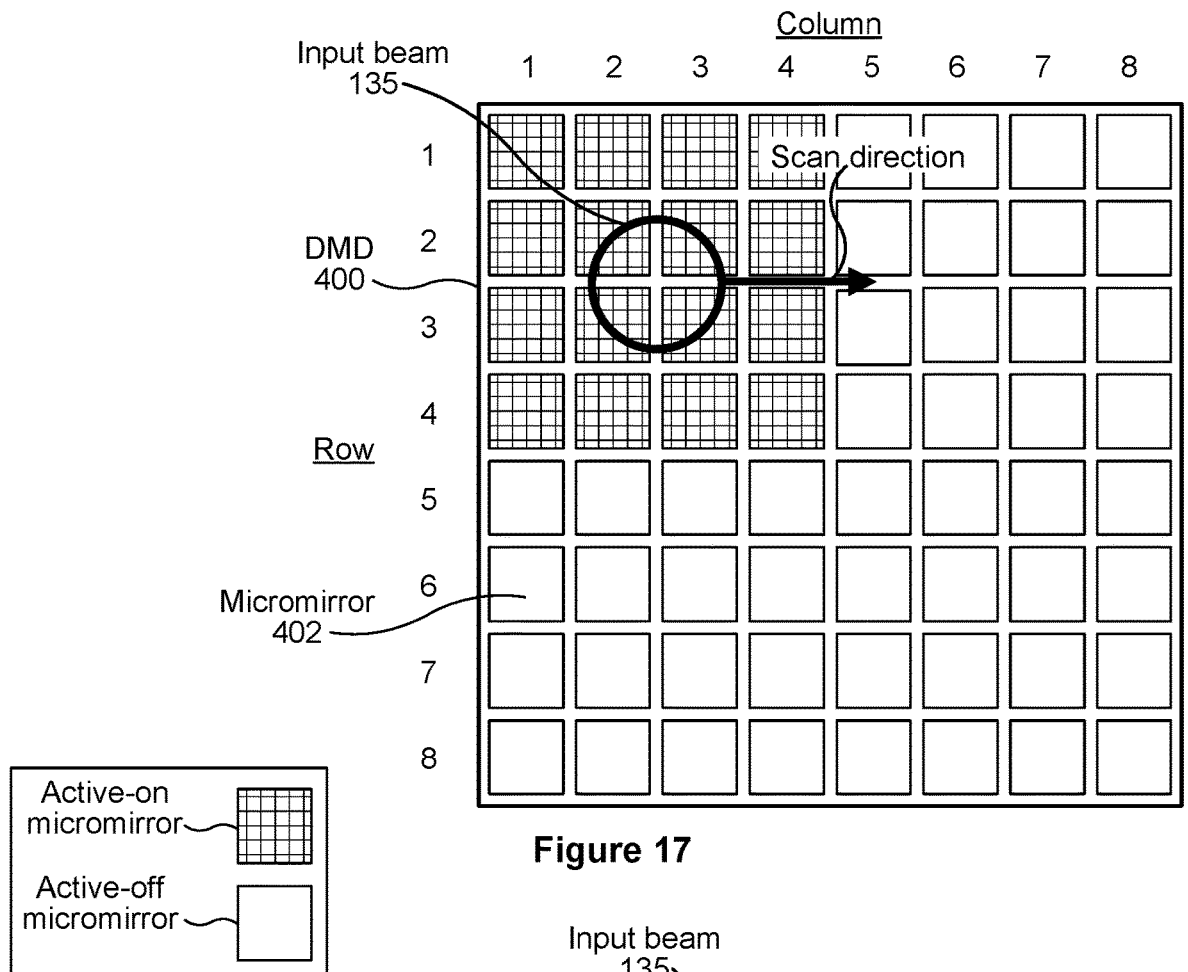

In particular embodiments, micromirrors 402 located within or near a region of incidence may be set to an active-on state. In FIG. 17, the 16 micromirrors in rows 1-4 and columns 1-4 are set to the active-on state. The four micromirrors in rows 2-3 and columns 2-3 overlap the region of incidence of the input beam 135 and may be referred to as being within the region of incidence. Additionally, the 12 active-on micromirrors in the following locations are located near the region of incidence: row 1 and columns 1-4; row 2 and columns 1 and 4; row 3 and columns 1 and 4; and row 4 and columns 1-4. In FIG. 17, the micromirrors 402 located near the region of incidence may be referred to as being within a distance of one micromirror from the region of incidence. Micromirrors 402 that are near a region of incidence may be located within any suitable distance of the region of incidence (e.g., located within 1, 2, 5, 10, 20, 30 50, or 100 micromirrors of the region of incidence). Micromirrors 402 located near a region of incidence may be set to the active-on state to allow for variations in the size or location of the input beam 135 on the DMD 400. For example, the size or location of the input beam 135 may vary depending on (i) the distance to the target 130 from which scattered light is received or (ii) movement of optical elements within the lidar system 100 associated with temperature variation, aging of the system, or mechanical shock or vibration applied to the system. If the size or location of the input beam 135 changes, having micromirrors 402 near the region of incidence set to the active-on state may allow the input beam 135 to still be reflected to the detector array 500.

Figure 18:
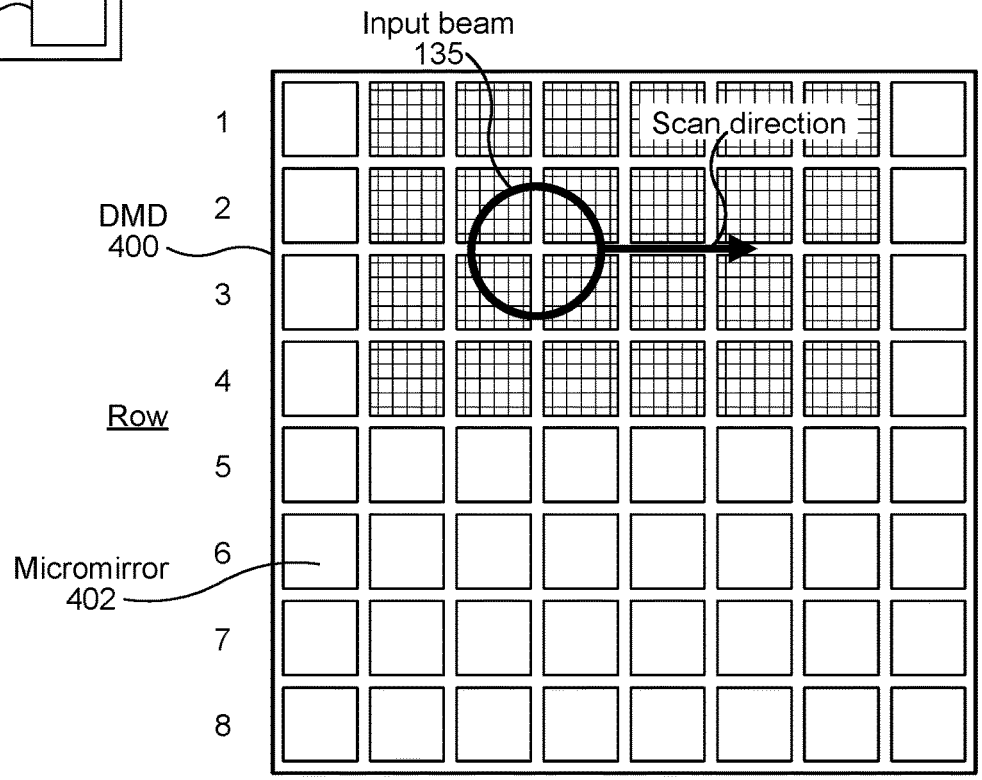

In particular embodiments, micromirrors 402 located within, near, or at a future location of a region of incidence may be set to an active-on state. In FIG. 18, the 24 micromirrors 402 in rows 1-4 and columns 2-7 are set to the active-on state. The four micromirrors 402 that overlap the region of incidence (located in rows 2-3 and columns 3-4) as well as the micromirrors 402 located near the region of incidence (e.g., within a distance of one micromirror) are set to the active-on state. Additionally, the micromirrors 402 located ahead of the region of interest (e.g., micromirrors 402 in rows 1-4 and columns 6-7), which correspond to a future location of the region of interest, are set to the active-on state. Setting micromirrors 402 located ahead of the region of interest to the active-on state may allow time for the micromirrors 402 to switch so that scattered light from a subsequently emitted pulse of light may be reflected to the detector array 500.

Figure 19:
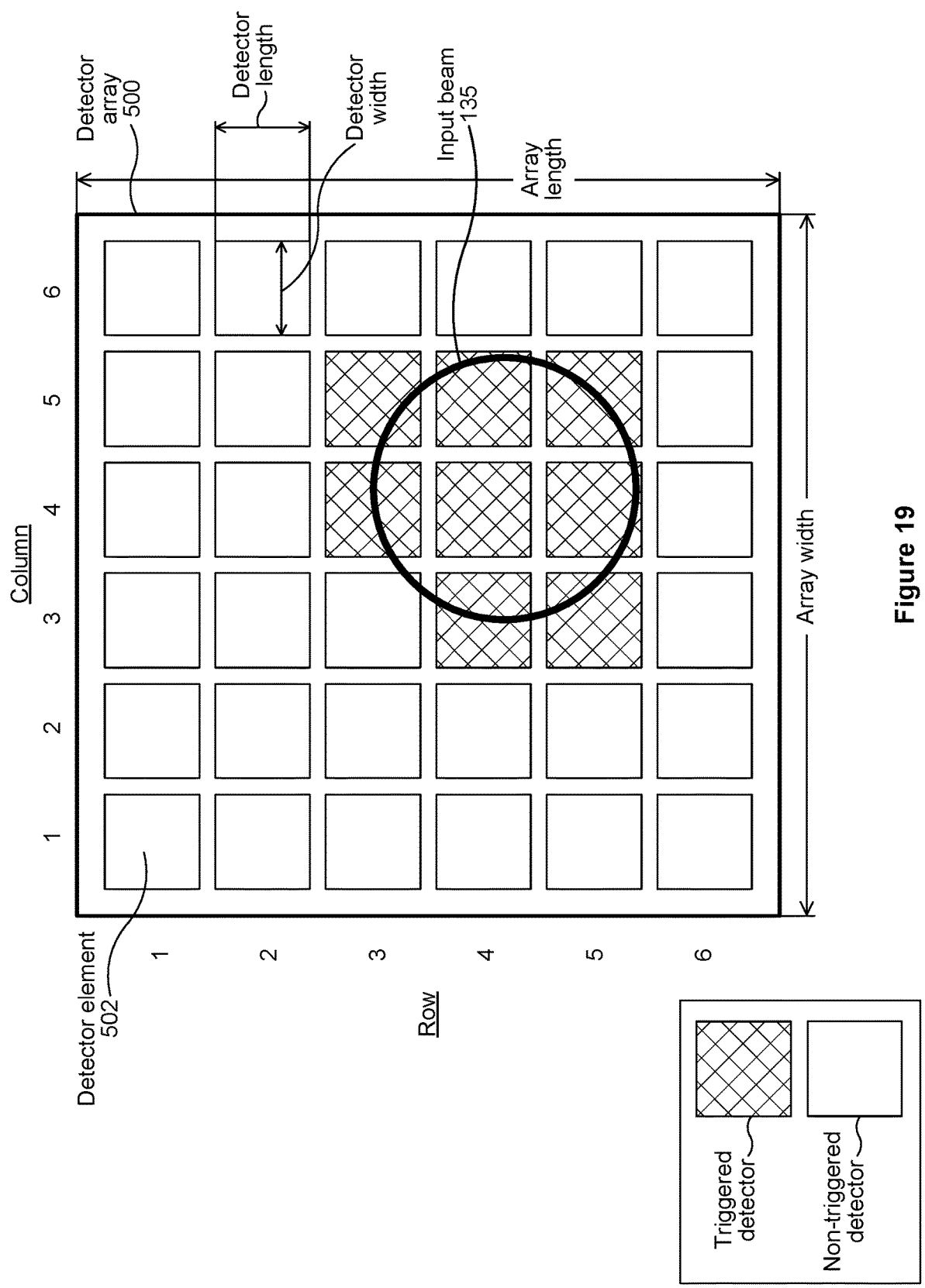
FIG. 19 illustrates a top view of an example detector array with an input beam that is incident on the detector array.

FIG. 19 illustrates a top view of an example detector array 500 with an input beam 135 that is incident on the detector array. In particular embodiments, a receiver 140 of a lidar system 100 may include a detector array 500 that includes a two-dimensional array of detector elements 502. A detector array 500 may include any suitable number of detector elements 502, such as for example, approximately 1, 10, $10^2$, $10^3$, $10^4$, or $10^5$ detector elements 502. For example, a detector array 500 may include approximately $10^4$ detector elements 502 arranged in an array with approximately 100 rows and 100 columns. The detector array 500 in FIG. 19 includes 36 detector elements 502 arranged in an array with six rows and six columns. The detector elements 502 of a detector array 500 may have a substantially round, oval, square, or rectangular shape with any suitable length, width, or diameter, such as for example, a length, width, or diameter of approximately 5 μm, 10 μm, 20 μm, 50 μm, or 100 μm. A detector array 500 may have any suitable array length or array width, such as for example, an array length or array width of approximately 1 mm, 2 mm, 5 mm, 10 mm, 20 mm, or 50 mm. For example, a detector array 500 with approximately 20,000 detector elements may have an array length of approximately 6 mm and an array width of approximately 6 mm.

In particular embodiments, a lidar system 100 may include a focusing lens (e.g., lens 440 in FIG. 11) that focuses an input beam 135 onto a detector array 500. The focusing lens 440 may be located between the DMD 400 and the detector array 500 and may focus light from the input beam 135 that is reflected by the DMD 400 onto the detector array 500. In FIG. 19, the input beam 135 may include a received pulse of light that is focused by a focusing lens 440 to a beam spot represented by the circle. For example, the focusing lens 440 may focus the input beam 135 onto the detector array 500 to a beam spot with a diameter of approximately 10 μm, 20 μm, 50 μm, 100 μm, 200 μm, 500 μm, or any other suitable diameter.

In particular embodiments, a receiver 140 may include a micro-lens array positioned above or near a detector array 500. A micro-lens array may include a two-dimensional array of micro-lenses, where each micro-lens focuses light that is incident on the micro-lens onto a particular detector element 502. For example, a detector array 500 with 100 detector elements 502 may have an array of 100 micro-lenses positioned above the detector array 500. Each micro-lens may be located above a particular detector element 502 and configured to focus incident light onto that detector element 502. A micro-lens array may improve the efficiency of a detector array 500 by capturing and focusing more light onto a detector element 502 than would otherwise be incident on the detector element 502. The detector elements 502 of a detector array 500 may have a fill factor of less than 100%, indicating that the photosensitive areas of the detector elements 502 cover less than 100% of the surface of the detector array. For example, the detector elements 502 of a detector array 500 may have a fill factor of approximately 60%, which indicates that approximately 40% of light that is incident on the detector array 500 may not be detected by a detector element 502. Capturing and focusing incident light onto the detector elements 502 of a detector array 500 may reduce the amount of incident light lost to the non-photosensitive areas of the detector array (e.g., the spaces between adjacent detector elements 502). By capturing and focusing the incident light with a micro-lens array, the effective fill factor of a detector array 500 may increase, which corresponds to an increase in the detection efficiency of the detector array 500.

In particular embodiments, each detector element 502 of a detector array 500 may include an avalanche photodiode (APD), a single-photon avalanche diode (SPAD), a PIN photodiode, or a black-silicon detector. A black-silicon detector may include silicon material with a surface modification that reduces the reflectivity of the silicon, and correspondingly increases the absorption of light by the silicon material. A black-silicon detector may be configured to detect light having a wavelength between approximately 400 nm and 1600 nm. For example, a detector array 500 with black-silicon detector elements 502 may be used in a receiver 140 of a lidar system 100 with an operating wavelength of approximately 905 nm, 1400 nm, 1505 nm, or 1550 nm.

In particular embodiments a detector array 500 may include silicon-based detector elements 502 configured to detect light at one or more wavelengths between approximately 800 nm and approximately 1100 nm. For example, a silicon-based detector array 500 may include an array of silicon PIN photodiodes, silicon APDs, or silicon SPADs. A detector array 500 with silicon-based detector elements 502 may be used in a receiver 140 of a lidar system 100 with an operating wavelength of approximately 905 nm.

In particular embodiments, a detector array 500 may include InGaAs-based detector elements 502 configured to detect light at one or more wavelengths between approximately 1200 nm and approximately 1600 nm. For example, a InGaAs-based detector array 500 may include an array of InGaAs PIN photodiodes, InGaAs APDs, or InGaAs SPADs. A detector array 500 with InGaAs-based detector elements 502 may be used in a receiver 140 of a lidar system 100 with an operating wavelength of approximately 1450 nm, 1505 nm, or 1550 nm.

In particular embodiments, a detector array 500 may include an array of APD or SPAD detector elements 502. An APD may include an absorption layer in which photons of received light are absorbed to generate electrical carriers (e.g., electrons and holes). Additionally, an APD may include an avalanche layer in which at least some of the photo-generated carriers collide with the semiconductor lattice of the avalanche layer and produce additional carriers through impact ionization. This avalanche process may repeat numerous times so that one photo-generated carrier results in the production of multiple additional carriers. For example, a single photon absorbed by an APD may lead to the generation of approximately 10, 50, 100, 200, 500, 1000, or 10,000 carriers through the avalanche-multiplication process. The gain of an APD (e.g., the number of carriers generated from a single photo-generated carrier) may increase as the reverse-bias voltage applied to the APD is increased. If the applied reverse-bias voltage is increased above a particular value referred to as the APD breakdown voltage, then a single carrier may trigger a self-sustaining avalanche process in which the output of the APD is saturated regardless of the input light level. An APD that is operated at or above a breakdown voltage may be referred to as a single-photon avalanche diode (SPAD) and may be referred to as operating in a Geiger mode or a photon-counting mode. An APD operated below a breakdown voltage may be referred to as an APD, a linear APD, or a linear-mode APD. The carriers generated in an APD or SPAD may produce an electrical current that is coupled to an electrical circuit which may perform signal amplification, sampling, filtering, signal conditioning, analog-to-digital conversion, time-to-digital conversion, pulse detection, threshold detection, rising-edge detection, or falling-edge detection.

In particular embodiments, a detector array 500 may include a semiconductor photomultiplier in which each detector element 502 includes a SPAD. For example, a detector array 500 may include a silicon photomultiplier (SiPM) where each detector element 502 includes a silicon SPAD. A SiPM detector array 500 may be part of a receiver 140 configured to detect light at any suitable wavelength between approximately 800 nm and approximately 1100 nm. As another example, a detector array 500 may include a InGaAs photomultiplier (InGaAs-PM) where each detector element 502 includes a InGaAs SPAD. A InGaAs-PM detector array 500 may be part of a receiver 140 configured to detect light at any suitable wavelength between approximately 1200 nm and 1600 nm. A SiPM detector array 500 or a InGaAs-PM detector array 500 may be referred to as a semiconductor photomultiplier detector array 500, and each detector element 502 may be referred to as a SPAD detector element 502 or as a microcell.

In particular embodiments, the SPAD detector elements 502 of a semiconductor photomultiplier detector array 500 may be electrically coupled together so that the electrical current from each of the triggered detector elements 502 is combined together. For example, a semiconductor photomultiplier detector array 500 may produce an output electrical signal that corresponds to a sum of electrical currents produced by each of the triggered SPAD detector elements 502 of the detector array 500. In a SiPM or InGaAs-PM detector array 500, the electrical current produced by each of the SPAD detector elements 502 may be combined together, so that the detector array 500 produces a single output electrical signal that corresponds to the sum of the electrical currents produced by each of the SPAD detector elements 502. By combining the electrical outputs of the SPAD detector elements 502 together, a semiconductor photomultiplier detector array 500 may act as a single detector. The single-detector behavior of a semiconductor photomultiplier detector array 500 may provide (i) a relatively high-speed temporal response of the individual SPAD detector elements 502 and (ii) a relatively large detection area achieved by coupling the individual SPAD detector elements 502 together. For example, a semiconductor photomultiplier detector array 500 may have a temporal rise-time or fall-time of less than approximately 0.5 ns, 1 ns, 2 ns, 5 ns, or 10 ns and a detection area of approximately 1×1 mm, 2×2 mm, 5×5 mm, or 10×10 mm.

In particular embodiments, each detector element 502 in a semiconductor photomultiplier detector array 500 may include a SPAD and a quench circuit. A quench circuit may be configured to reduce a reverse-bias voltage applied to the SPAD below the breakdown voltage when an avalanche event occurs in the SPAD. Reducing the applied voltage below the breakdown voltage may halt the avalanche process, and the applied reverse-bias voltage may then be re-set to await a subsequent avalanche event (e.g., detection of a subsequently received pulse of light). A quench circuit may be a passive quench circuit that includes a resistor in series with the SPAD. Prior to an avalanche event (e.g., with little or no light incident on a SPAD detector element 502), the current produced by the SPAD may be approximately zero amps, and the reverse-bias voltage applied across the SPAD may be at a nominal, maximum value. When an avalanche event occurs in the SPAD detector element 502 (e.g., when a received pulse of light is detected), the SPAD may produce electrical current which flows through the series resistor. The current flowing through the series resistor may result in the reverse-bias voltage applied across the SPAD being reduced below the breakdown voltage, which may halt the avalanche process. After the avalanche event, the current produced by the SPAD may drop back to approximately zero amps, and the reverse-bias voltage applied across the SPAD may recover back to its nominal value.

In particular embodiments, a pulse of light received by a semiconductor photomultiplier detector array 500 may cause some of the SPAD detector elements 502 to produce an electrical current. The received pulse of light may be part of an input beam 135 that is directed to the detector array 500 by a DMD 400, and the electrical current produced by a SPAD detector element 502 may indicate detection of the received pulse of light. The electrical current produced by a SPAD detector element 502 may result from an avalanche-detection event in the SPAD detector element 502 that is triggered by the received pulse of light, and the SPAD detector element 502 may be referred to as being triggered. Each SPAD detector element 502 that detects a portion of a received pulse of light may produce a particular amount of electrical current which indicates that the SPAD detector element 502 has been triggered. As long as the amount of light received by a SPAD detector element 502 is above a threshold to trigger an avalanche event, the particular amount of electrical current produced by a triggered SPAD detector element 502 may be approximately the same for each of the triggered detector elements 502, regardless of the amount of light received. In FIG. 19, eight SPAD detector elements 502 have been triggered by a received pulse of light that is part of the input beam 135. The other SPAD detector elements 502 (including the detector element 502 in row 3 and column 3) are not triggered since they did not receive enough light from the received pulse of light to trigger an avalanche event.

Figure 20:
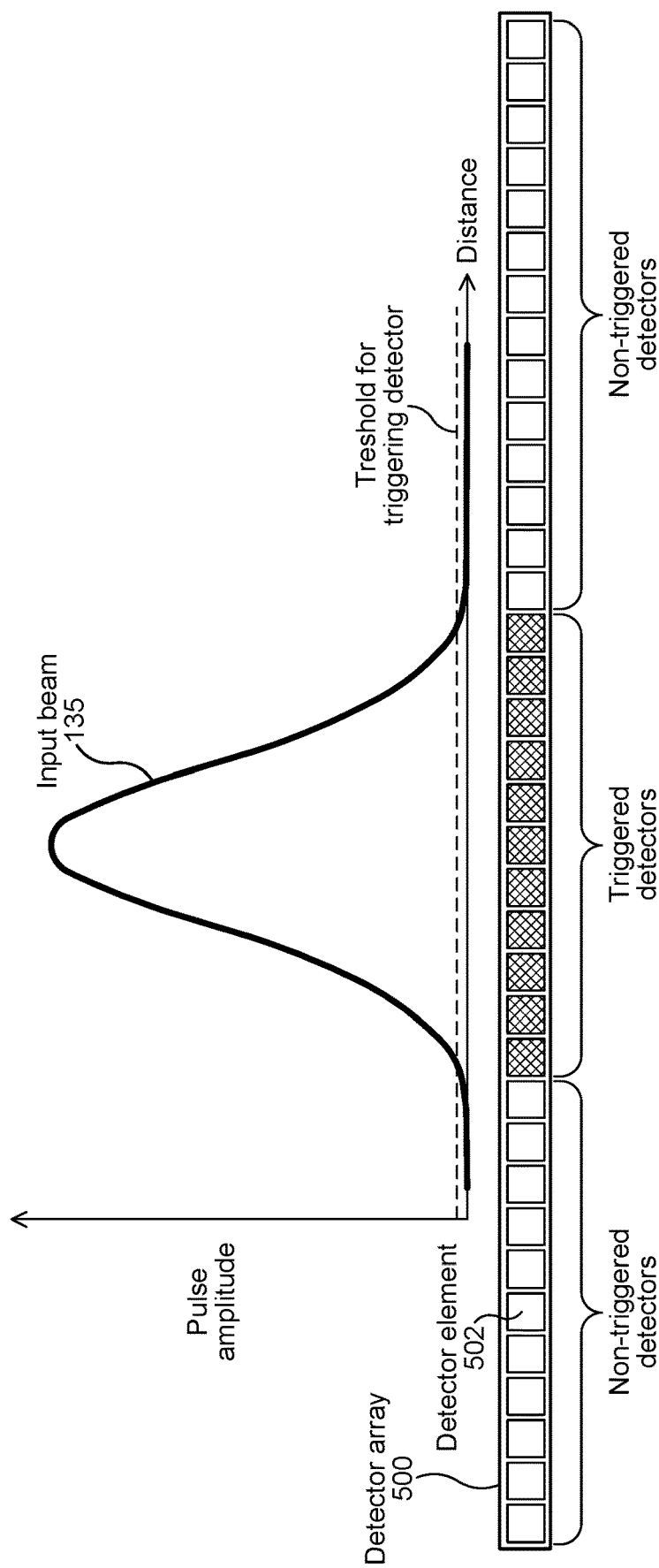
FIG. 20 illustrates a side view of an example detector array along with an amplitude profile of an input beam incident on the detector array.

FIG. 20 illustrates a side view of an example detector array 500 along with an amplitude profile of an input beam 135 incident on the detector array. The amplitude of the input beam 135 may correspond to the energy, power, or intensity of a received pulse of light plotted versus distance or location along the detector array 500. The dashed line in FIG. 20 represents an energy, power, or intensity threshold for triggering a SPAD detector element 502. For example, each SPAD detector element 502 that receives, within a particular time interval, greater than a particular threshold energy of light from a received pulse of light may be triggered. The time interval for receiving greater than the particular threshold energy of light may be any suitable amount of time (e.g., approximately 1×, 2×, 5×, or 10× the duration of a received pulse of light). If the energy of light received by a SPAD detector element 502 exceeds the triggering threshold, then the SPAD detector element 502 may be triggered and may produce a particular amount of electrical current in response to receiving greater than the triggering threshold. Eleven of the SPAD detector elements 502 in FIG. 20 are triggered by a received pulse of light, and the other detector elements are not triggered. The currents produced by each of the eleven triggered SPAD detector elements 502 may be combined to produce a single output electrical signal of the DMD 400.

In particular embodiments, a processor (e.g., controller 150) may determine that a received pulse of light is associated with an emitted pulse of light if an electrical signal produced by a detector array 500 in response to the received pulse of light is above a minimum threshold value. The electrical signal produced by a semiconductor photomultiplier detector array 500 may include a pulse of electrical current associated with a received pulse of light. For example, the pulse of electrical current may correspond to the sum of electrical currents produced by each of the triggered SPAD detector elements 502 in response to detecting the received pulse of light. The detector array 500 or receiver 140 may include electrical circuitry that integrates the pulse of electrical current or converts the pulse of electrical current into a voltage signal. The voltage signal may be compared to a minimum threshold voltage value, and if the voltage signal exceeds the threshold voltage value, the processor may determine that the received pulse of light includes light from a pulse of light emitted by a light source 110 of the lidar system 100. Setting a minimum threshold value may ensure that an electrical signal produced by a detector array 500 is associated with a valid received pulse of light. Additionally, setting a minimum threshold value may prevent a low-level signal (e.g., a spurious signal caused by electrical or optical noise) from being mistakenly identified as valid received pulse of light.

In particular embodiments, a processor (e.g., controller 150) may determine that a received pulse of light is associated with an emitted pulse of light if an electrical signal produced by a detector array 500 in response to the received pulse of light is above a minimum threshold value and below a maximum threshold value. For example, a voltage signal produced by a detector array 500 or receiver 140 in response to a received pulse of light may be compared to a minimum threshold voltage value and a maximum threshold voltage value. If the voltage signal is between the two threshold voltage values, then a processor may determine that the received pulse of light is a valid received pulse of light that includes light from a pulse of light emitted by a light source 110 of the lidar system 100. Setting minimum and maximum threshold values may ensure than an electrical signal produced by a detector array 500 is associated with a valid received pulse of light. For example, setting a maximum threshold value may prevent an electrical noise spike or a stray-light event (e.g., a pulse of light received from another lidar sensor), from being mistakenly identified as a valid received pulse of light.

A received pulse of light directed to a detector array 500 by a DMD 400 may be incident on a particular number of SPAD detector elements 502, and some or all of those SPAD detector elements 502 may be triggered by the received pulse of light. As an example, an input beam 135 that includes a received pulse of light may be configured to be incident on approximately 1, 2, 5, 10, 20, 50, 100, 500, 1000 SPAD detector elements 502, or any other suitable number of SPAD detector elements 502. An electrical signal produced by a semiconductor photomultiplier detector array 500 being above a minimum threshold value and below a maximum threshold value may correspond to the number of triggered SPAD detector elements 502 being greater than a minimum threshold number and less than a maximum threshold number. For example, if a received pulse of light is configured to be incident on approximately N detector elements 502 of a detector array 500, then the minimum threshold number of triggered detector elements 502 may be approximately 25%, 50% 75%, or 90% of N, and the maximum threshold number of triggered threshold detector elements 502 may be approximately 110%, 125%, 150%, or 175% of N. For example, if the number of triggered detector elements 502 is greater than 75% of N and less than 125% of n, then a processor may determine that the received pulse of light is associated with a pulse of light emitted by the light source 110. Otherwise, the processor may determine that the received pulse of light is not associated with an emitted pulse of light, and the processor may disregard the electrical signal produced by the detector array 500. As another example, an input beam 135 that includes a received pulse of light may be incident on approximately 100 detector elements 502 of a detector array 500. If the number of triggered detector elements 502 is greater than 75 and less than 125, then a processor may determine that the received pulse of light is associated with an emitted pulse of light. In the example of FIG. 19, the input beam 135 may be configured to be incident on approximately nine detector elements 502. If the number of triggered detector elements 502 is greater than seven and less than 11, then a processor may determine that an electrical signal produced by the detector array 500 is a valid signal that corresponds to a received pulse of light associated with an emitted pulse of light.

In particular embodiments, a processor (e.g., controller 150) may determine that a received optical signal is not valid based on an electrical signal produced by a detector array 500 in response to the received optical signal. For example, if the electrical signal produced in response to a received optical signal is less than a minimum threshold value or greater than a maximum threshold value, then the processor may determine that the received optical signal is not valid. A non-valid signal that is below a minimum threshold value may be a low-level signal caused by electrical or optical noise. A non-valid signal that exceeds the maximum threshold value may be caused by an electrical noise event (e.g., an electrical noise spike produced by the detector array 500) or by a stray-light event (e.g., stray light received from another light source, such as for example, sunlight, light from vehicle headlights, or light from another lidar sensor). In response to determining that a received optical signal is not valid, a processor may disregard the electrical signal associated with the received optical signal.

In particular embodiments, a receiver 140 may include two or more detector arrays 500. For example, a receiver 140 may include 2, 3, 4, 5, 10, or any other suitable number of detector arrays 500 located near or adjacent to one another. The detector arrays 500 may be configured to receive an input beam 135 reflected from a DMD 400. Each of the detector arrays 500 may be configured to detect a received pulse of light and produce an electrical signal corresponding to the received pulse of light. A processor (e.g., controller 150) may determine whether a received optical signal is a valid optical signal based at least in part on one or more electrical signals produced by the detector arrays 500. An input beam 135 may be directed to the detector arrays 500 so that each received pulse of light is incident on only one of the detector arrays 500. In this case, a valid received pulse of light may result in a particular electrical signal (e.g., an electrical signal that is greater than a minimum threshold value and less than a maximum threshold value) being produced by only one of the detector arrays 500. If a received optical signal results in two or more of the detector arrays 500 each producing an electrical signal corresponding to receipt of a pulse of light, then a processor may determine that the received optical signal is not valid. Additionally, the processor may disregard the received optical signal. An optical signal that is not valid may include sunlight, light from vehicle headlights, or light from other lidar sensors. The electrical signals produced by the two or more detector arrays 500 may be produced approximately simultaneously (e.g., within a particular time interval of one another, such as for example within a time interval of approximately 1×, 2×, 5×, or 10× the duration of a received pulse of light). Since a valid received pulse of light that is part of an input beam 135 is configured to be incident only one of the detector arrays 500 at a time, an electrical signal produced by two or more detector arrays 500 at the same time may not be associated with a pulse of light emitted by the light source 110. In response to receiving two or more electrical signals at the same time from two or more of the detector arrays 500, a processor may disregard the electrical signals.

Figure 21:
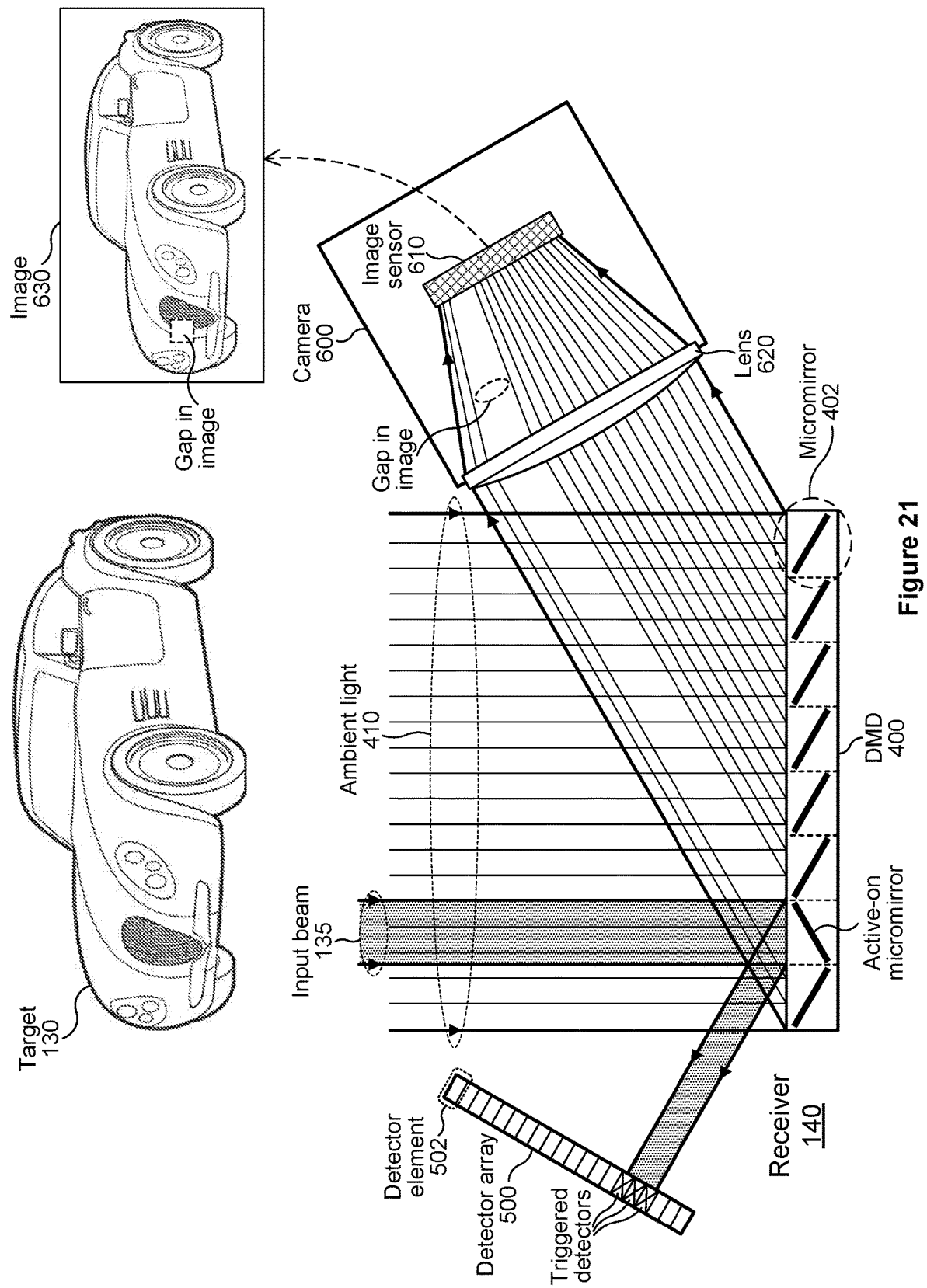
FIG. 21 illustrates an example receiver that includes a digital micromirror device (DMD), a detector array, and a camera.

FIG. 21 illustrates an example receiver 140 that includes a digital micromirror device (DMD) 400, a detector array 500, and a camera 600. In particular embodiments, a lidar system 100 may include a receiver 140 with a DMD 400, a detector array 500, and a camera 600. The camera 600 may include an optical image sensor 610 and a lens 620. The lens 620 may receive ambient light 410 from the active-off micromirrors 402 of the DMD 400 and may focus the received ambient light 410 onto the image sensor 610. The image sensor 610 may include a charge-coupled device (CCD) image sensor or a complementary metal-oxide semiconductor (CMOS) image sensor. The image sensor 610 may be configured to detect visible light, near-infrared light, or light at any other suitable wavelength. The lens 620 may form an image on the image sensor 610 of a scene from the environment around the lidar system 100, and the image sensor 610 may produce a corresponding two-dimensional image 630 of the scene. Additionally, the lidar system 100 may scan an output beam 125 across a FOR and may produce a three-dimensional point cloud of the environment around the lidar system 100.

In FIG. 21, the input beam 135, which may include a received pulse of light, is reflected by one or more active-on micromirrors 402 of the DMD 400 and directed to a detector array 500. Ambient light 410 that is incident on the DMD 400 may be reflected by the active-off micromirrors 402 and directed to an image sensor 610 of a camera 600. Ambient light may include sunlight, light from streetlights, or light from other light sources that is scattered or reflected from targets 130 located in the environment around a lidar system 100. The image sensor 610 may receive ambient light 410 from the active-off micromirrors of the DMD 400 and produce a two-dimensional image 630 that includes one or more objects located in the FOR of the lidar system 100. In FIG. 21, the image sensor 610 produces a two-dimensional image 630 that includes a vehicle (target 130), which may be located in the FOR of the lidar system 100.

In FIG. 21, the receiver 140 may receive an input beam 135 with emitted pulses of light that are scattered by the vehicle (target 130). As the lidar system 100 scans an output beam 125 with emitted pulses of light across a FOR, the lidar system 100 may produce a three-dimensional point cloud that includes a three-dimensional representation of the vehicle. Additionally, the camera may receive ambient light 410 and produce a two-dimensional image 630 that includes an image of the vehicle. In particular embodiments, a three-dimensional point cloud produced by a lidar system 100 and a two-dimensional image 630 produced by a camera 600 may be spatially registered to one another. The lidar point cloud and the camera image 630 being spatially registered to one another may refer to the lidar point cloud and camera image 630 having a definite or known spatial relationship to one another so that they may be combined or overlapped without significant spatial offset or error in the location of objects. For example, when a lidar point cloud and the camera image 630 in FIG. 21 are combined together, the vehicle from the point cloud may be spatially overlapped with the vehicle from the camera image without significant offset between the two representations of the vehicle. For example, the spatial offset between the two representations of the vehicle may be less than 1%, 5%, or 10% of a dimension of the vehicle (e.g., a length, width, or height of the vehicle). In particular embodiments, spatial registration between a lidar point cloud and a camera image 630 may be provided by the input beam 135 and the ambient light 410 being received as substantially coaxial input beams. The input beam 135 and the ambient light 410 received by the receiver 410 may travel in approximately the same direction or may have little or no lateral offset. This may result in little or no parallax between the lidar point cloud and the camera image 630, which may allow the lidar point cloud and the camera image 630 to be overlapped without significant spatial offset or error.

In particular embodiments, a camera image 630 may include a gap that may provide for accurate overlap of a lidar point cloud and the camera image 630. The gap in the camera image 630 may arise from the portion of ambient light 410 that is coincident with the input beam 135 and that is reflected by active-on micromirrors 402 (and not directed to the image sensor 610). This may produce a gap or blank region in the camera image 630, and the gap or blank region may correspond to the location of a corresponding pixel 210 in the lidar point cloud. The gap in a camera image 630 and a corresponding pixel 210 in a lidar point cloud may provide a registration feature that allows the camera image 630 and lidar point cloud to be overlapped. By aligning one or more gaps in a camera image 630 with one or more corresponding pixels 210 in a point cloud, the camera image 630 and point cloud may be overlapped with minimal spatial offset or error.

In particular embodiments, a receiver 140 of a lidar system 100 may include a spatial light modulator (SLM) and a detector array 500. The SLM may include a two-dimensional array of electrically addressable spatial-light-modulator elements (SLM elements), where a portion of the SLM elements are configured to be activated to direct a received pulse of light to the detector array 500. As an example, the SLM may include a DMD 400, as described above, where the SLM elements correspond to the micromirrors 402 of the DMD 400. As another example, the SLM may include a reflective liquid-crystal (LC) device (e.g., a liquid-crystal-on-silicon (LCoS) device), where each SLM element of the reflective LC device includes a LC module and a reflective material disposed behind the LC module. The LC modules may be activated to transmit a received pulse of light to the reflective material, and the reflective material may reflect the received pulse of light to the detector array 500. As another example, the SLM may include a transmissive liquid-crystal (LC) device, where each SLM element of the transmissive LC device includes a LC module that may be activated to transmit a received pulse of light to the detector array 500.

Various example aspects directed to lidar systems with a receiver that includes a digital micromirror device (DMD) or a spatial light modulator (SLM) are described below.

Aspect 1. A lidar system comprising: a light source configured to emit a pulse of light; a scanner configured to direct the emitted pulse of light into a field of regard of the lidar system; a receiver configured to receive a portion of the emitted pulse of light scattered by a target located a distance from the lidar system, the receiver comprising: a digital micromirror device (DMD) comprising a two-dimensional array of electrically addressable micromirrors, wherein a portion of the micromirrors are configured to be set to an active-on state to direct the received pulse of light to a detector array; and the detector array, wherein the detector array comprises a two-dimensional array of detector elements, wherein the detector array is configured to detect the received pulse of light and produce an electrical signal corresponding to the received pulse of light; and a processor configured to determine, based at least in part on the electrical signal produced by the detector array, that the received pulse of light is associated with the emitted pulse of light.

Aspect 2. The lidar system of aspect 1, wherein the light source comprises: a seed laser diode configured to produce a seed optical pulse; and a fiber-optic amplifier configured to amplify the seed optical pulse to produce the emitted pulse of light.

Aspect 3. The lidar system of aspect 1, wherein the light source comprises a direct-emitter laser diode configured to produce the emitted pulse of light.

Aspect 4. The lidar system of aspect 1, wherein the light source comprises a diode-pumped solid state (DPSS) laser configured to produce the emitted pulse of light.

Aspect 5. The lidar system of aspect 1, wherein the light source comprises: a seed laser diode configured to produce a seed optical pulse; and a semiconductor optical amplifier (SOA) configured to amplify the seed optical pulse to produce the emitted pulse of light.

Aspect 6. The lidar system of aspect 5, wherein the SOA comprises an input end, an output end, and a tapered waveguide extending from the input end to the output end, wherein a width of the tapered waveguide increases from the input end towards the output end, and the amplified seed optical pulse is emitted from the output end.

Aspect 7. The lidar system of aspect 5, wherein the seed laser diode and the SOA are integrated together and disposed on or in a single chip or substrate.

Aspect 8. The lidar system of aspect 1, wherein the light source comprises: a seed laser diode configured to produce a seed optical pulse; a semiconductor optical amplifier (SOA) configured to amplify the seed optical pulse to produce an amplified seed optical pulse; and a fiber-optic amplifier configured to further amplify the amplified seed optical pulse to produce the emitted pulse of light.

Aspect 9. The lidar system of aspect 1, wherein the scanner comprises one or more micro-electro-mechanical systems (MEMS) scan mirrors configured to scan pulses of light emitted by the light source across a scan pattern contained within the field of regard, wherein the scan pattern comprises a plurality of scan lines scanned sequentially.

Aspect 10. The lidar system of aspect 1, wherein the scanner comprises one or more scan mirrors, wherein each scan mirror is mechanically driven by a galvanometer scanner, a synchronous electric motor, a microelectromechanical systems (MEMS) device, a resonant scanner, or a voice coil motor.

Aspect 11. The lidar system of aspect 1, wherein the scanner comprises: a first scan mirror configured to scan light emitted by the light source along a first direction within the field of regard; and a polygon mirror configured to scan the emitted light along a second direction within the field of regard, wherein the second direction is substantially orthogonal to the first direction.

Aspect 12. The lidar system of aspect 1, wherein the emitted pulse of light is one of a plurality of emitted pulses of light emitted by the light source, wherein the emitted pulses of light have: a wavelength between 900 nm and 1700 nm; a pulse energy between 0.01 µJ and 100 µJ; a pulse repetition frequency between 80 kHz and 10 MHz; and a pulse duration between 0.1 ns and 100 ns.

Aspect 13. The lidar system of aspect 1, wherein the processor is further configured to determine, in response to determining that the received pulse of light is associated with the emitted pulse of light, the distance from the lidar system to the target based at least in part on a round-trip time for the portion of the emitted pulse of light to travel from the lidar system to the target and back to the lidar system.

Aspect 14. The lidar system of aspect 1, wherein the lidar system is part of a vehicle comprising an advanced driver assistance system (ADAS) configured to assist a driver of the vehicle in operating the vehicle, wherein the lidar system is configured to provide information about a surrounding environment of the vehicle to the ADAS.

Aspect 15. The lidar system of aspect 1, wherein the lidar system is part of an autonomous vehicle comprising an autonomous-vehicle driving system configured to guide the autonomous vehicle through a surrounding environment toward a destination, wherein the lidar system is configured to provide information about the surrounding environment to the autonomous-vehicle driving system.

Aspect 16. A lidar system comprising: a light source configured to emit a pulse of light; a scanner configured to direct the emitted pulse of light into a field of regard of the lidar system; a receiver configured to receive a portion of the emitted pulse of light scattered by a target located a distance from the lidar system, the receiver comprising: a spatial light modulator (SLM) comprising a two-dimensional array of electrically addressable spatial-light-modulator elements (SLM elements), wherein a portion of the SLM elements are configured to be activated to direct the received pulse of light to a detector array; and the detector array, wherein the detector array comprises a two-dimensional array of detector elements, wherein the detector array is configured to detect the received pulse of light and produce an electrical signal corresponding to the received pulse of light; and a processor configured to determine, based at least in part on the electrical signal produced by the detector array, that the received pulse of light is associated with the emitted pulse of light.

Aspect 17. The lidar system of aspect 16, wherein the SLM comprises a digital micromirror device (DMD), wherein each SLM element of the DMD comprises a micromirror configured to be set to an active-on state or an active-off state, wherein at least some of the active-on micromirrors are configured to reflect the received pulse of light to the detector array.

Aspect 18. The lidar system of aspect 16, wherein the SLM comprises a reflective liquid-crystal (LC) device, wherein each SLM element of the reflective LC device comprises a liquid-crystal module and a reflective material disposed behind the liquid-crystal module, wherein: the activated liquid-crystal modules are configured to transmit the received pulse of light to the reflective material; and the reflective material is configured to reflect the received pulse of light of light to the detector array.

Aspect 19. The lidar system of aspect 18, wherein the reflective liquid-crystal device is a liquid-crystal-on-silicon (LCoS) device.

Aspect 20. The lidar system of aspect 16, wherein the SLM comprises a transmissive liquid-crystal (LC) device, wherein each SLM element of the transmissive LC device comprises a liquid-crystal module, wherein the activated liquid-crystal modules are configured to transmit the received pulse of light to the detector array.

Aspect 21. A lidar system comprising: a light source configured to emit a pulse of light; a scanner configured to direct the emitted pulse of light into a field of regard of the lidar system; a receiver configured to receive a portion of the emitted pulse of light scattered by a target located a distance from the lidar system, the receiver comprising: a spatial light modulator (SLM) comprising a two-dimensional array of electrically addressable spatial-light modulator elements (SLM elements), wherein a portion of the SLM elements are configured to be activated to direct the received pulse of light to a detector array; and the detector array, wherein the detector array comprises a two-dimensional array of detector elements, wherein one or more of the detector elements are configured to detect the received pulse of light; and a processor configured to determine the distance from the lidar system to the target based at least in part on a round-trip time for the portion of the emitted pulse of light to travel from the lidar system to the target and back to the lidar system.

Figure 22:
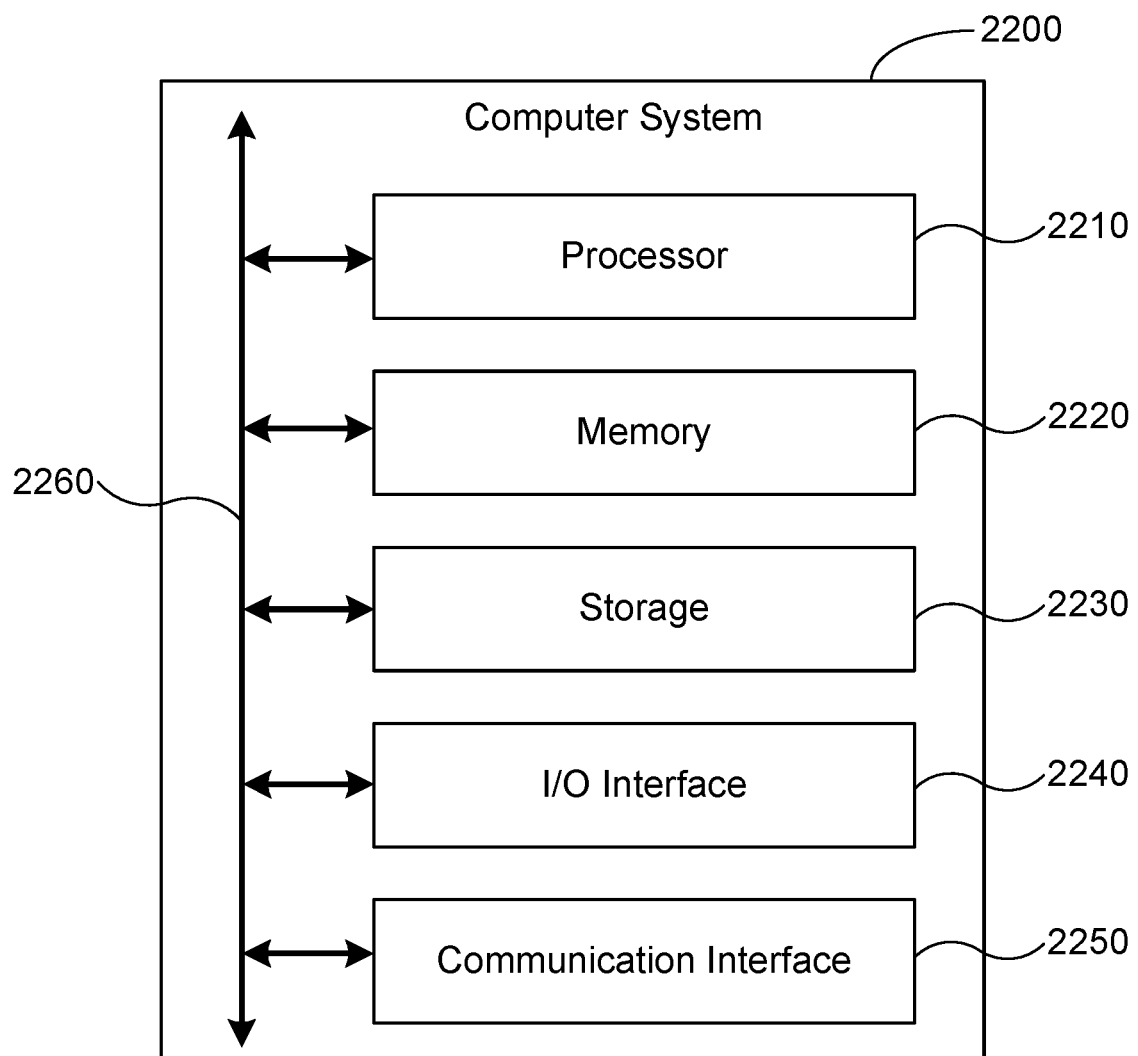
FIG. 22 illustrates an example computer system.

FIG. 22 illustrates an example computer system 2200. In particular embodiments, one or more computer systems 2200 may perform one or more steps of one or more methods described or illustrated herein. In particular embodiments, one or more computer systems 2200 may provide functionality described or illustrated herein. In particular embodiments, software running on one or more computer systems 2200 may perform one or more steps of one or more methods described or illustrated herein or may provide functionality described or illustrated herein. Particular embodiments may include one or more portions of one or more computer systems 2200. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 2200 may take any suitable physical form. As an example, computer system 2200 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 2200 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle di splay (e.g., odometer di splay or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 2200 may include one or more computer systems 2200; be unitary or distributed; span multiple locations; span multiple machines; span multiple data centers; or reside in a cloud, which may include one or more cloud components in one or more networks. Where appropriate, one or more computer systems 2200 may perform without substantial spatial or temporal limitation one or more steps of one or more methods described or illustrated herein. As an example, one or more computer systems 2200 may perform in real time or in batch mode one or more steps of one or more methods described or illustrated herein. One or more computer systems 2200 may perform at different times or at different locations one or more steps of one or more methods described or illustrated herein, where appropriate.

As illustrated in the example of FIG. 22, computer system 2200 may include a processor 2210, memory 2220, storage 2230, an input/output (I/O) interface 2240, a communication interface 2250, or a bus 2260. Computer system 2200 may include any suitable number of any suitable components in any suitable arrangement.

In particular embodiments, processor 2210 may include hardware for executing instructions, such as those making up a computer program. As an example, to execute instructions, processor 2210 may retrieve (or fetch) the instructions from an internal register, an internal cache, memory 2220, or storage 2230; decode and execute them; and then write one or more results to an internal register, an internal cache, memory 2220, or storage 2230. In particular embodiments, processor 2210 may include one or more internal caches for data, instructions, or addresses. Processor 2210 may include any suitable number of any suitable internal caches, where appropriate. As an example, processor 2210 may include one or more instruction caches, one or more data caches, or one or more translation lookaside buffers (TLBs). Instructions in the instruction caches may be copies of instructions in memory 2220 or storage 2230, and the instruction caches may speed up retrieval of those instructions by processor 2210. Data in the data caches may be copies of data in memory 2220 or storage 2230 for instructions executing at processor 2210 to operate on; the results of previous instructions executed at processor 2210 for access by subsequent instructions executing at processor 2210 or for writing to memory 2220 or storage 2230; or other suitable data. The data caches may speed up read or write operations by processor 2210. The TLBs may speed up virtual-address translation for processor 2210. In particular embodiments, processor 2210 may include one or more internal registers for data, instructions, or addresses. Processor 2210 may include any suitable number of any suitable internal registers, where appropriate. Where appropriate, processor 2210 may include one or more arithmetic logic units (ALUs); may be a multi-core processor; or may include one or more processors 2210.

In particular embodiments, memory 2220 may include main memory for storing instructions for processor 2210 to execute or data for processor 2210 to operate on. As an example, computer system 2200 may load instructions from storage 2230 or another source (such as, for example, another computer system 2200) to memory 2220. Processor 2210 may then load the instructions from memory 2220 to an internal register or internal cache. To execute the instructions, processor 2210 may retrieve the instructions from the internal register or internal cache and decode them. During or after execution of the instructions, processor 2210 may write one or more results (which may be intermediate or final results) to the internal register or internal cache. Processor 2210 may then write one or more of those results to memory 2220. One or more memory buses (which may each include an address bus and a data bus) may couple processor 2210 to memory 2220. Bus 2260 may include one or more memory buses. In particular embodiments, one or more memory management units (MMUs) may reside between processor 2210 and memory 2220 and facilitate accesses to memory 2220 requested by processor 2210. In particular embodiments, memory 2220 may include random access memory (RAM). This RAM may be volatile memory, where appropriate. Where appropriate, this RAM may be dynamic RAM (DRAM) or static RAM (SRAM). Memory 2220 may include one or more memories 2220, where appropriate.

In particular embodiments, storage 2230 may include mass storage for data or instructions. As an example, storage 2230 may include a hard disk drive (HDD), a floppy disk drive, flash memory, an optical disc, a magneto-optical disc, magnetic tape, or a Universal Serial Bus (USB) drive or a combination of two or more of these. Storage 2230 may include removable or non-removable (or fixed) media, where appropriate. Storage 2230 may be internal or external to computer system 2200, where appropriate. In particular embodiments, storage 2230 may be non-volatile, solid-state memory. In particular embodiments, storage 2230 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 2230 may include one or more storage control units facilitating communication between processor 2210 and storage 2230, where appropriate. Where appropriate, storage 2230 may include one or more storages 2230.

In particular embodiments, I/O interface 2240 may include hardware, software, or both, providing one or more interfaces for communication between computer system 2200 and one or more I/O devices. Computer system 2200 may include one or more of these I/O devices, where appropriate. One or more of these I/O devices may enable communication between a person and computer system 2200. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 2240 may include one or more device or software drivers enabling processor 2210 to drive one or more of these I/O devices. I/O interface 2240 may include one or more I/O interfaces 2240, where appropriate.

In particular embodiments, communication interface 2250 may include hardware, software, or both providing one or more interfaces for communication (such as, for example, packet-based communication) between computer system 2200 and one or more other computer systems 2200 or one or more networks. As an example, communication interface 2250 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 2200 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 2200 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 2200 may communicate using fiber-optic communication based on 100 Gigabit Ethernet (100 GbE), 10 Gigabit Ethernet (10 GbE), or Synchronous Optical Networking (SONET). Computer system 2200 may include any suitable communication interface 2250 for any of these networks, where appropriate. Communication interface 2250 may include one or more communication interfaces 2250, where appropriate.

In particular embodiments, bus 2260 may include hardware, software, or both coupling components of computer system 2200 to each other. As an example, bus 2260 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 2260 may include one or more buses 2260, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 2200. As an example, computer software may include instructions configured to be executed by processor 2210. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
   a light source configured to emit a pulse of light;
   a scanner configured to direct the emitted pulse of light into a field of regard of the lidar system;
   a receiver configured to receive a portion of the emitted pulse of light scattered by a target located a distance from the lidar system, the receiver comprising:
      a digital micromirror device (DMD) comprising a two-dimensional array of electrically addressable micromirrors, wherein a portion of the micromirrors are configured to be set to an active-on state to direct the received pulse of light to a detector array; and
      the detector array, wherein the detector array comprises a two-dimensional array of detector elements, wherein the detector array is configured to detect the received pulse of light and produce an electrical signal corresponding to the received pulse of light; and
   a processor configured to:
      determine, based at least in part on the electrical signal produced by the detector array, that the received pulse of light is associated with the emitted pulse of light if the electrical signal produced by the detector array is above a minimum threshold value and below a maximum threshold value; and
      determine that a subsequently received optical signal is not valid if a corresponding electrical signal produced by the detector array in response to the subsequently received optical signal is less than the minimum threshold value or greater than the maximum threshold value, and disregard the subsequently received optical signal in response to determining that the subsequently received optical signal is not valid.

2. The lidar system of claim 1, wherein each micromirror of the DMD is configured to be set to the active-on state or to an active-off state, wherein at least some of the active-on micromirrors are configured to reflect the received pulse of light to the detector array.

3. The lidar system of claim 1, wherein the micromirrors configured to be set to the active-on state are associated with a region of the DMD where the received pulse of light is incident on the DMD.

4. The lidar system of claim 3, wherein each of the active-on micromirrors is located near or is overlapped with the region of the DMD where the received pulse of light is incident on the DMD.

5. The lidar system of claim 3, wherein micromirrors of the DMD that are not associated with the region of the DMD where the received pulse of light is incident on the DMD are configured to be set to an active-off state, wherein light that is incident on an active-off micromirror is directed away from the detector array.

6. The lidar system of claim 3, wherein:
   the emitted pulse of light is one of a plurality of pulses of light emitted by the light source;
   the scanner is further configured to scan the emitted pulses of light in a scan direction across the field of regard; and
   one or more of the active-on micromirrors are further configured to be set to an active-off state after the received pulse of light is detected by the detector array, wherein the micromirrors configured to be set to the active-off state are located on a side of the region that is opposite a direction associated with the scan direction of the emitted pulses of light.

7. The lidar system of claim 1, wherein the active-on micromirrors are set to the active-on state prior to a time when the emitted pulse of light is emitted by the light source.

8. The lidar system of claim 1, wherein the scanner and the DMD are configured to be operated synchronously, wherein:
   the scanner is configured to direct the emitted pulse of light into the field of regard at a particular angle; and
   the portion of the micromirrors are configured to be set to the active-on state based at least in part on the particular angle at which the emitted pulse of light is directed.

9. The lidar system of claim 1, wherein:
   the light source is further configured to emit a subsequent pulse of light; and
   in response to the emission of the subsequent pulse of light, one or more active-on micromirrors of the DMD are configured to be set to an active-off state, and one or more active-off micromirrors are configured to be set to the active-on state.

10. The lidar system of claim 1, wherein:
   the emitted pulse of light is a first pulse of light emitted by the light source;
   the light source is further configured to emit a second pulse of light after the first pulse of light is emitted;

the scanner is further configured to scan emitted pulses of light comprising the first and second pulses of light in a scan direction across the field of regard; and additional micromirrors of the DMD are configured to be set to the active-on state to direct received light from the second pulse of light to the detector array, wherein:

the additional active-on micromirrors are located adjacent to a region of the DMD where the received pulse of light is incident on the DMD and along a direction associated with the scan direction; and the additional active-on micromirrors are configured to be set to the active-on state prior to emission of the second pulse of light.

11. The lidar system of claim 1, wherein:

the emitted pulse of light is one of a plurality of pulses of light emitted by the light source;

the scanner is further configured to scan the emitted pulses of light across a scan pattern contained within the field of regard;

scattered light from the emitted pulses of light is received as an input beam of light by the receiver, wherein the input beam of light is incident on the DMD over a region of incidence that corresponds to the region of the DMD where the received pulse of light is incident on the DMD;

the region of incidence moves across a surface of the DMD in a pattern that corresponds to the scan pattern of the emitted pulses of light; and the micromirrors of the DMD are configured to be dynamically set to the active-on state or an active-off state as the region of incidence moves across the surface, wherein micromirrors located at or near a current or future location of the region of incidence are configured to be set to the active-on state.

12. The lidar system of claim 1, further comprising an input lens configured to focus the received pulse of light onto the DMD.

13. The lidar system of claim 1, wherein the detector array comprises a silicon photomultiplier (SiPM) wherein each detector element of the SiPM comprises a single-photon avalanche diode (SPAD).

14. The lidar system of claim 1, wherein each detector element of the detector array comprises an avalanche photodiode (APD), a single-photon avalanche diode (SPAD), a PIN photodiode, or a black-silicon detector.

15. The lidar system of claim 1, wherein the detector elements comprise silicon-based detectors configured to detect light at one or more wavelengths within a 800-1100 nanometer wavelength range or indium-gallium-arsenide-based detectors configured to detect light at one or more wavelengths within a 1200-1600 nanometer wavelength range.

16. The lidar system of claim 1, further comprising a lens configured to focus the received pulse of light onto the detector array.

17. The lidar system of claim 1, wherein the subsequently received optical signal being not valid corresponds to an electrical noise event or a stray-light event.

18. The lidar system of claim 1, wherein micromirrors set to an active-off state are configured to direct ambient light received by the receiver away from the detector array.

19. A lidar system comprising:

a light source configured to emit a pulse of light;

a scanner configured to direct the emitted pulse of light into a field of regard of the lidar system;

a receiver configured to receive a portion of the emitted pulse of light scattered by a target located a distance from the lidar system, the receiver comprising:

a digital micromirror device (DMD) comprising a two-dimensional array of electrically addressable micromirrors, wherein a portion of the micromirrors are configured to be set to an active-on state to direct the received pulse of light to a detector array; and the detector array, wherein the detector array comprises a two-dimensional array of detector elements, wherein the detector array is configured to detect the received pulse of light and produce an electrical signal corresponding to the received pulse of light, wherein:

the received pulse of light directed to the detector array by the DMD is configured to be incident on a particular number of the detector elements;

each detector element that receives, within a particular time interval, greater than a particular threshold energy of light from the received pulse of light is configured to be triggered, wherein the triggered detector element produces a particular amount of electrical current in response to receiving greater than the particular threshold energy; and the electrical signal produced by the detector array corresponds to a sum of the electrical currents produced by the triggered detector elements; and a processor configured to determine, based at least in part on the electrical signal produced by the detector array, that the received pulse of light is associated with the emitted pulse of light if the electrical signal produced by the detector array is above a minimum threshold value and below a maximum threshold value, wherein the electrical signal being above the minimum threshold value and below the maximum threshold value corresponds to a number of the triggered detector elements being greater than a minimum threshold number and less than a maximum threshold number.

20. The lidar system of claim 19, wherein the particular time interval corresponds to a duration of the emitted pulse of light.

21. The lidar system of claim 19, wherein:

the minimum threshold number is approximately 75% of the particular number of the detector elements on which the received pulse of light is configured to be incident; and the maximum threshold number is approximately 125% of the particular number of the detector elements on which the received pulse of light is configured to be incident.

22. A lidar system comprising:

a light source configured to emit a pulse of light;

a scanner configured to direct the emitted pulse of light into a field of regard of the lidar system;

a receiver configured to receive a portion of the emitted pulse of light scattered by a target located a distance from the lidar system, the receiver comprising:

a digital micromirror device (DMD) comprising a two-dimensional array of electrically addressable micromirrors, wherein a portion of the micromirrors are configured to be set to an active-on state to direct the received pulse of light to a first detector array of a plurality of detector arrays; and the plurality of detector arrays, wherein:

each detector array comprises a two-dimensional array of detector elements, and each detector array is configured to produce an electrical signal corresponding to a receipt of a pulse of light; and the first detector array is configured to detect the received pulse of light and produce an electrical signal corresponding to the received pulse of light; and a processor configured to:

determine, based at least in part on the electrical signal produced by the first detector array, that the received pulse of light is associated with the emitted pulse of light; and determine that a subsequently received optical signal is not valid if two or more of the detector arrays each simultaneously produce an electrical signal corresponding to receipt of a pulse of light.

23. The lidar system of claim 22, wherein the subsequently received optical signal being not valid corresponds to the subsequently received optical signal comprising sunlight, light from a vehicle headlight, or light from another lidar system.

24. The lidar system of claim 22, wherein the processor is configured to determine that the received pulse of light is associated with the emitted pulse of light if the electrical signal produced by the first detector array is above a minimum threshold value.

25. A lidar system comprising:

a light source configured to emit a pulse of light;

a scanner configured to direct the emitted pulse of light into a field of regard of the lidar system;

a receiver configured to receive a portion of the emitted pulse of light scattered by a target located a distance from the lidar system, the receiver comprising:

a digital micromirror device (DMD) comprising a two-dimensional array of electrically addressable micromirrors, wherein a portion of the micromirrors are configured to be set to an active-on state to direct the received pulse of light to a detector array;

the detector array, wherein the detector array comprises a two-dimensional array of detector elements, wherein the detector array is configured to detect the received pulse of light and produce an electrical signal corresponding to the received pulse of light; and an optical image sensor, wherein micromirrors of the DMD set to an active-off state are configured to direct ambient light received by the receiver to the image sensor; and a processor configured to determine, based at least in part on the electrical signal produced by the detector array, that the received pulse of light is associated with the emitted pulse of light.

26. The lidar system of claim 25, wherein the receiver further comprises a lens configured to receive the ambient light from the active-off micromirrors and focus the ambient light onto the optical image sensor.

27. The lidar system of claim 25, wherein the optical image sensor comprises a charge-coupled device (CCD) image sensor or a complementary metal-oxide semiconductor (CMOS) image sensor.

28. The lidar system of claim 25, wherein the optical image sensor is configured to receive the ambient light from the active-off micromirrors of the DMD and produce a two-dimensional image that includes one or more objects located in the field of regard of the lidar system.

29. The lidar system of claim 28, wherein the lidar system is configured to produce a three-dimensional point cloud that includes a three-dimensional representation of one or more of the objects in the two-dimensional image, wherein the two-dimensional image and the three-dimensional point cloud are spatially registered to one another.

\* \* \* \* \*